US012102222B2

(12) United States Patent
Pennington et al.

(10) Patent No.: US 12,102,222 B2
(45) Date of Patent: Oct. 1, 2024

(54) WORK TABLE

(71) Applicant: Arête Outdoors, Inc., North Hollywood, CA (US)

(72) Inventors: Matthew Pennington, Los Angeles, CA (US); Rob Strickler, Austin, TX (US); Kyle Ellison, Austin, TX (US); Lucas Levitsky, Santa Cruz, CA (US)

(73) Assignee: ARÊTE OUTDOORS, INC., North Hollywood, CA (US)

( * ) Notice: Subject to any disclaimer, the term of this patent is extended or adjusted under 35 U.S.C. 154(b) by 0 days.

(21) Appl. No.: 18/471,604

(22) Filed: Sep. 21, 2023

(65) Prior Publication Data

US 2024/0115038 A1  Apr. 11, 2024

Related U.S. Application Data

(60) Provisional application No. 63/378,558, filed on Oct. 6, 2022.

(51) Int. Cl.
*A47B 3/08* (2006.01)
*A47B 9/14* (2006.01)
*B62D 33/023* (2006.01)
*B62D 63/04* (2006.01)

(52) U.S. Cl.
CPC ............ *A47B 3/08* (2013.01); *A47B 9/14* (2013.01); *B62D 33/023* (2013.01); *B62D 63/04* (2013.01); *A47B 2003/0827* (2013.01)

(58) Field of Classification Search
CPC ..... A47B 3/08; A47B 2003/0827; A47B 9/14; B62D 63/04; B62D 33/023

USPC .......................................................... 108/44
See application file for complete search history.

(56) References Cited

U.S. PATENT DOCUMENTS

| | | | | |
|---|---|---|---|---|
| 2,683,069 A | * | 7/1954 | Kimmel | A47B 3/08 |
| | | | | 108/125 |
| 10,889,223 B2 | * | 1/2021 | Pascarella | B62D 33/0273 |
| 11,452,368 B1 | | 9/2022 | Li | |
| 11,825,936 B1 | * | 11/2023 | Powell | A47B 3/091 |

(Continued)

FOREIGN PATENT DOCUMENTS

GB           286326 A     3/1928

OTHER PUBLICATIONS

International Search Report and Written Opinion issued Jan. 26, 2024 in PCT/US23/74745.

*Primary Examiner* — Daniel J Rohrhoff
(74) *Attorney, Agent, or Firm* — Fox Rothschild LLP; Carol Thorstad-Forsyth

(57) ABSTRACT

Systems and methods comprising: cause first legs to rotate towards the center of the table until the first legs reside adjacent to the upper or lower part of the table; cause the first legs to slide against the upper or lower part in a first direction away from the center of the table until second ends of the first legs are received into openings formed in first couplers coupling the first legs to the upper part; cause the second legs to rotate towards the center of the table until the second legs reside adjacent to the upper or lower part of the table; and cause the second legs to slide against the upper or lower part in a second direction away from the center of the table until second ends of the second legs are received into openings formed in second couplers coupling the second legs to the upper part.

21 Claims, 41 Drawing Sheets

(56) References Cited

U.S. PATENT DOCUMENTS

| | | | |
|---|---|---|---|
| 2003/0205178 A1* | 11/2003 | Marrujo | A47B 3/00 108/115 |
| 2005/0115476 A1* | 6/2005 | Savoie | A47B 83/04 108/115 |
| 2005/0188902 A1* | 9/2005 | Savoie | A47B 3/08 108/107 |
| 2006/0191448 A1* | 8/2006 | Chen | A47B 13/021 108/156 |
| 2010/0018442 A1* | 1/2010 | Knudsen | A47B 3/08 108/176 |
| 2011/0155021 A1* | 6/2011 | Geitner | A47B 3/08 108/65 |
| 2016/0227920 A1* | 8/2016 | Turner | A47B 3/083 |
| 2019/0001481 A1* | 1/2019 | Faibish | A47B 3/08 |
| 2022/0144352 A1* | 5/2022 | Nelson | A47B 3/10 |

* cited by examiner

Figure 20A:
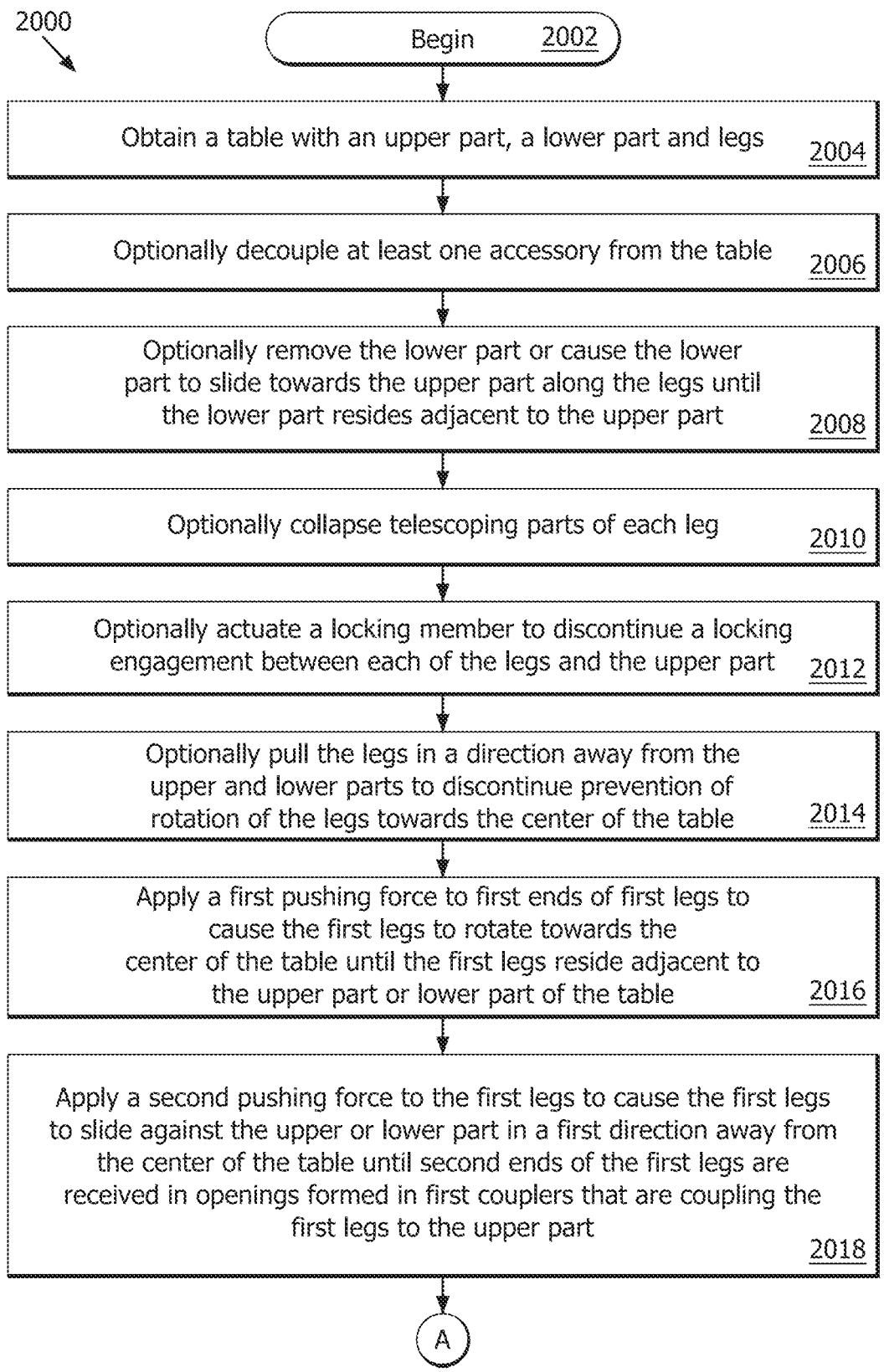

From FIG. 20A

| Optionally use a shaft extending through an elongated slot of each first leg to limit a distance that the first legs can travel in the first direction | 2020 |

Apply a third pushing force to first ends of second legs to cause the second legs to rotate towards the center of the table until the second legs reside adjacent to the lower part of the table  2022

Apply a fourth pushing force to the second legs to cause the second legs to slide against the upper or lower part in a second direction away from the center of the table until second ends of the second legs are received in opening formed in second couplers that are coupling the second legs to the upper part  2024

Optionally use a shaft extending through an elongated slot of each second leg to limit a distance that the second legs can travel in the second direction  2026

Optionally storing the table in a tailgate of a truck  2028

End or perform other operations  2030

FIG. 20B

WORK TABLE

CROSS-REFERENCE TO RELATED APPLICATIONS

The present application claims priority to and the benefit of U.S. Provisional Patent Application No. 63/378,558 which was filed on Oct. 6, 2022. The content of this Provisional Patent Application is incorporated herein by reference in its entirety.

BACKGROUND

A number of table designs exist. Some permit the collapse of the table for storage. However, many of the collapsible tables provide only specific table configurations, and are usually limited to a top, flat table surface with legs extending downward therefrom. In addition, most collapsible tables have some cross bar or support structure that extends between a lower surface of the table to one or more of the legs.

SUMMARY

This document concerns systems and methods for operating a table with an upper part providing a tabletop, a lower part providing a shelf, and a plurality of legs. The table is transitioned from a deployed configuration to a stowed configuration by: applying a first pushing force to first ends of first legs which are coupled to each other by a first cross bar (the first pushing force causes the first legs to rotate towards the center of the table until the first legs reside adjacent to the upper part or lower part of the table); applying a second pushing force to the first legs to cause the first legs to slide against the upper or lower part in a first direction away from the center of the table until second ends of the first legs are received into openings formed in first couplers that are coupling the first legs to the upper part; applying a third pushing force to first ends of second legs which are coupled to each other by a second cross bar (wherein the second pushing force causes the second legs to rotate towards the center of the table until the second legs reside adjacent to the upper or lower part of the table); and applying a fourth pushing force to the second legs to cause the second legs to slide against the upper or lower part in a second direction away from the center of the table until second ends of the second legs are received into openings formed in second couplers that are coupling the second legs to the upper part (wherein the second direction is opposite the first direction). When the first and second legs reside adjacent to the upper or lower part, one or more of the following exist: (i) the first ends of the second legs are both nested between first ends of the first legs, (ii) the first ends of the second legs extend parallel to the first ends of the second legs, and (iii) the first ends of the second legs horizontally and vertically overlap the first ends of the first legs.

The method may also comprise: causing the lower part to slide towards the upper part along a plurality of legs of the table until the lower part resides adjacent to the upper part, prior to application of the first pushing force; and/or actuating a locking member to allow movement of the lower part relative to the upper part prior causing the lower part to slide towards the upper part. Additionally or alternatively, the method comprises removing the lower part from the table prior to application of the first pushing force.

The methods may further comprise: collapsing telescoping parts of each leg of the plurality of legs prior to application of the first and third pushing forces; pulling the first legs and the second legs in a direction away from the upper and lower parts to discontinue prevention of rotation of the first and second legs towards the center of the table; actuating a locking member to discontinue a locking engagement between each of the first and second legs and the upper part, prior to said pulling; using a shaft extending through an elongated slot of each leg of the first and second legs to limit a distance that the leg can travel in the first direction and to limit a distance that the leg can travel in the second direction, when the leg resides adjacent to the upper or lower part of the table; decoupling at least one accessory from the table prior to application of the first pushing force, wherein the decoupling is achieved by sliding a protruding structure of the at least one accessory through a channel of a track coupled to or integrated with a sidewall of the upper part; and/or storing the table in a tailgate of a truck by sliding at least right and left side portions of the upper part into brackets coupled to the tailgate when the table is in the stowed configuration.

This document also concerns a table. The table comprises: an upper part providing a tabletop; a lower part providing a shelf; a plurality of legs comprising first legs that are coupled to each other by a first cross bar and second legs that are coupled to each other by a second cross bar; and a plurality of couplers coupling the first legs and the second legs to the upper part. The table is transitionable from a deployed configuration to a stowed configuration via (i) an application of a first pushing force to first ends of first legs which causes the first legs to rotate towards the center of the table until the first legs reside adjacent to the upper part or lower part of the table, (ii) an application of a second pushing force to the first legs which causes the first legs to slide against the upper or lower part in a first direction away from the center of the table until second ends of the first legs are received into openings formed in first couplers of the plurality of coupler, (iii) an application of a third pushing force to first ends of second legs which causes the second legs to rotate towards the center of the table until the second legs reside adjacent to the upper or lower part of the table, and (iv) an application of a fourth pushing force to the second legs to cause the second legs to slide against the upper or lower part in a second direction away from the center of the table until second ends of the second legs are received into openings formed in second couplers of the plurality of couplers.

The first ends of the second legs may horizontally and/or vertically overlap the first ends of the first legs when the first and second legs reside adjacent to the upper or lower part. The lower part may be: removable from the table; and/or slidable towards the upper part along a plurality of legs until the lower part resides adjacent to the upper part and is slidable away from the upper part along the plurality of legs until the lower part is supported by the first and second cross bars. In the later case, the table may also comprise a locking member configured to selectively allow movement of the lower part relative to the upper part. The legs may comprises telescoping parts.

The couplers may be configured to require a pulling force to be applied to the first legs and the second legs in a direction away from the upper part to discontinue prevention of rotation of the first and second legs towards the center of the table. The table may further comprise: a locking member configured to allow a selective discontinuance of a locking engagement between each of the first and second legs and the upper part; a shaft extending through an elongated slot of each leg of the first and second legs and configured to limit a distance that the leg can travel in the first direction and to limit a distance that the leg can travel in the second direction, when the leg resides adjacent to the upper or lower part of the table; at least one aperture formed in the upper part that is configured to receive at least a portion of an accessory; and/or a track coupled to or integrated with a sidewall of the upper part, wherein the track comprises a channel through which a protruding structure of an accessory can slide. At least right and left side portions of the upper part may be sized and shaped to slide into and out of brackets coupled to a tailgate of a truck when the table is in the stowed configuration.

DRAWINGS

This disclosure is facilitated by reference to the following drawing figures, in which like numerals represent like items throughout the figures.

FIGS. 1-4 each provides an illustration of a table according to the present solution.

Figure 5:
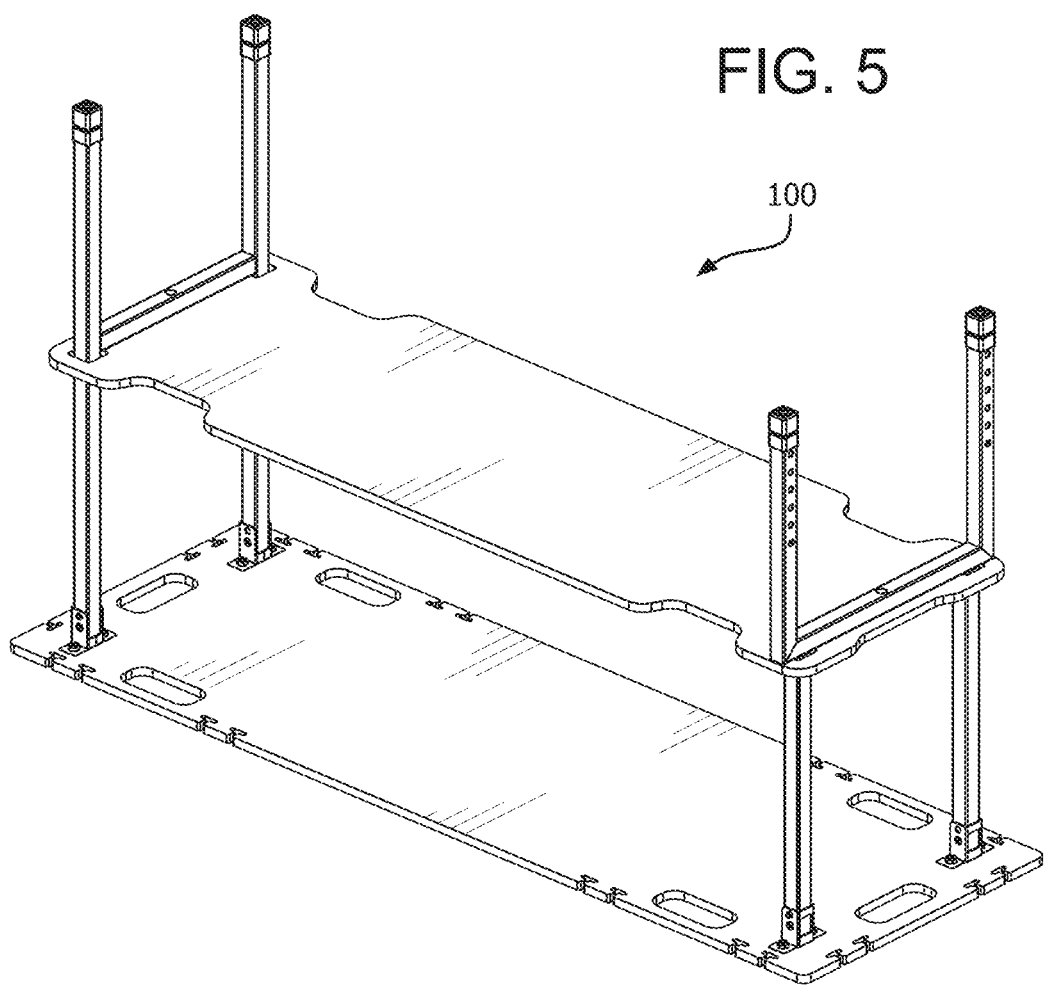

FIG. 5 provides a bottom perspective view of the table in an expanded position.

Figure 6:
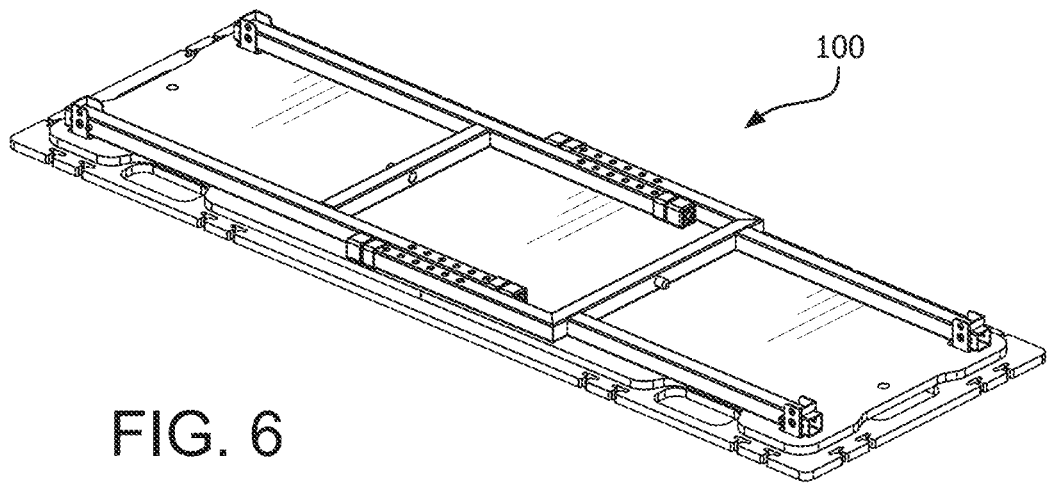

FIG. 6 provides a bottom perspective view of the table in a collapsed configuration.

FIGS. 7A-7D provide illustrations that are useful for understanding how the table of FIGS. 1-4 is transitioned from a deployed or expanded configuration to a stowed or collapsed configuration.

FIGS. 8A-8F (collectively referred to herein as "FIG. 8") provide illustrations of the table and components thereof.

FIGS. 9A-9F (collectively referred to herein as "FIG. 9") provide illustrations that are useful for understanding how leg portions of the table transition from an expanded position to a collapsed position.

FIGS. 10A-10E (collectively referred to herein as "FIG. 10") provide illustrations of a truck tail gate having a collapsible table.

Figure 11A:
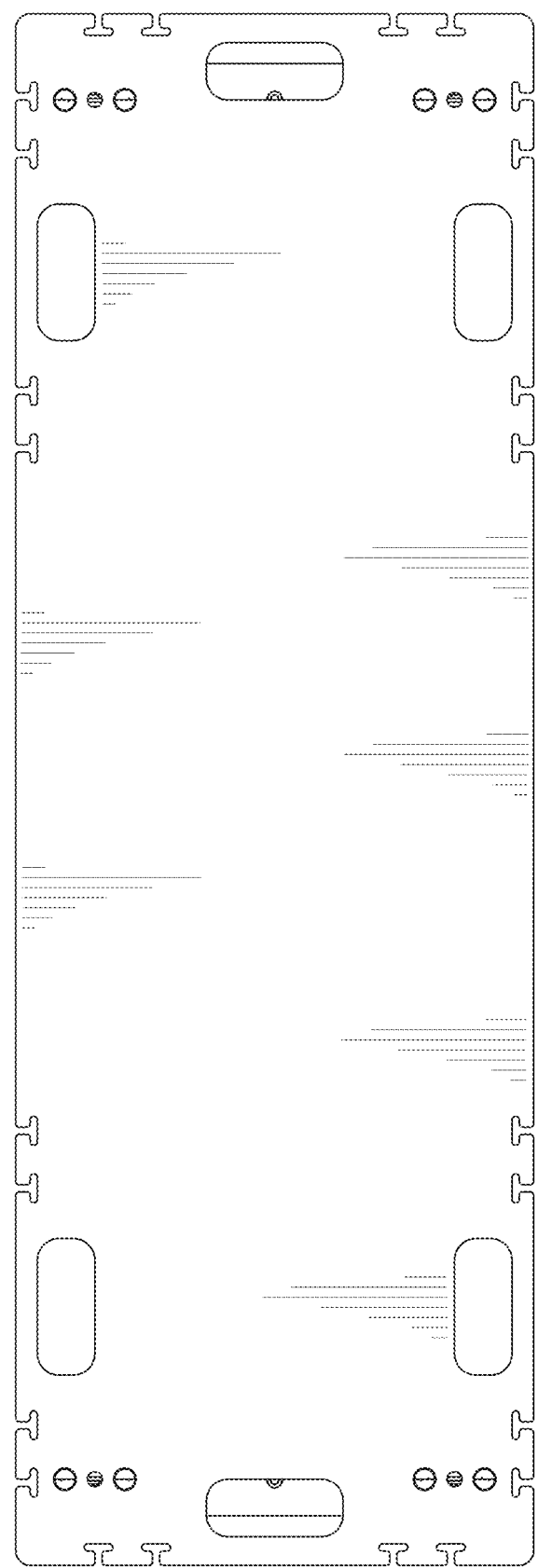
Figure 11B:
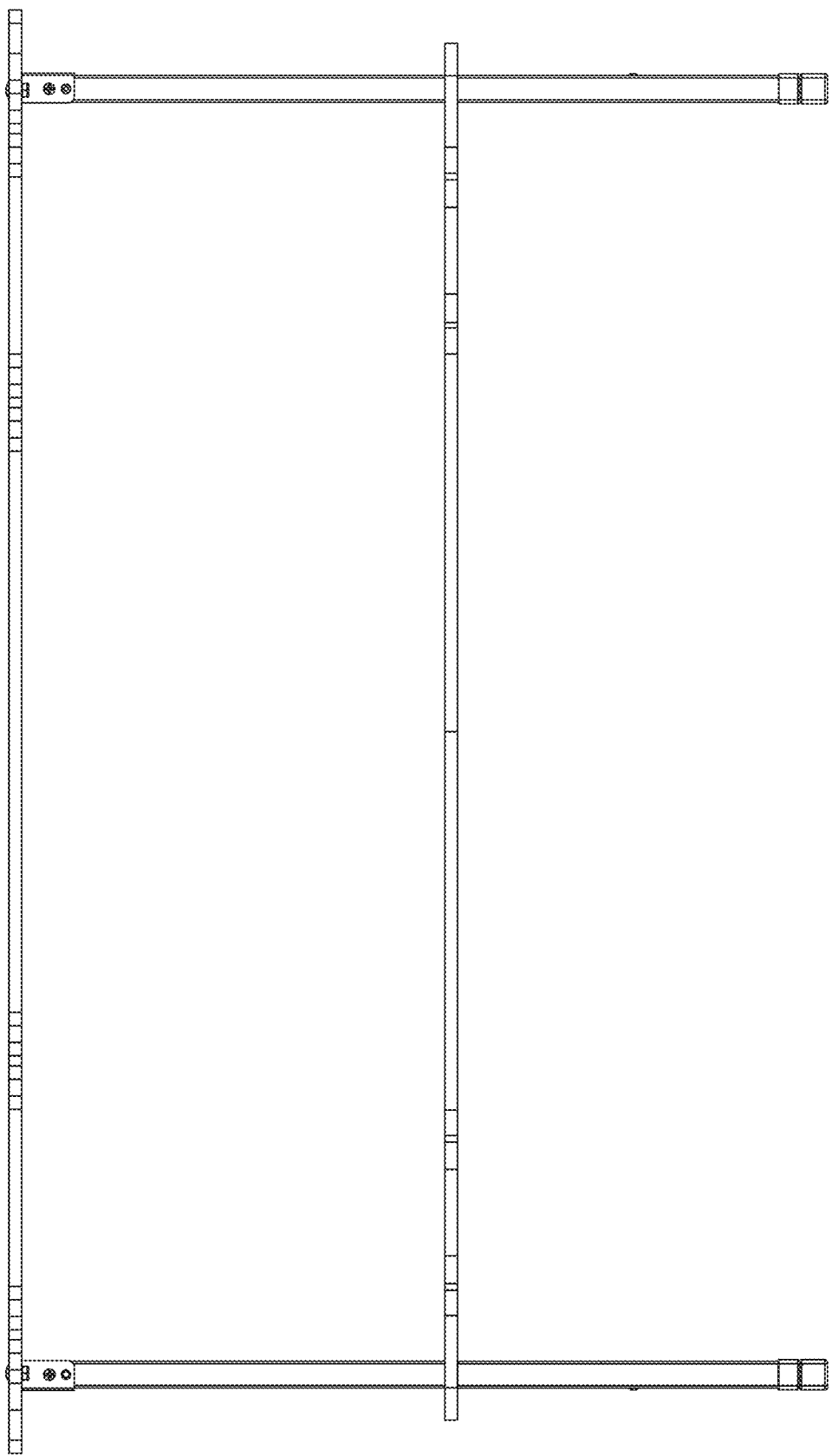
Figure 11C:
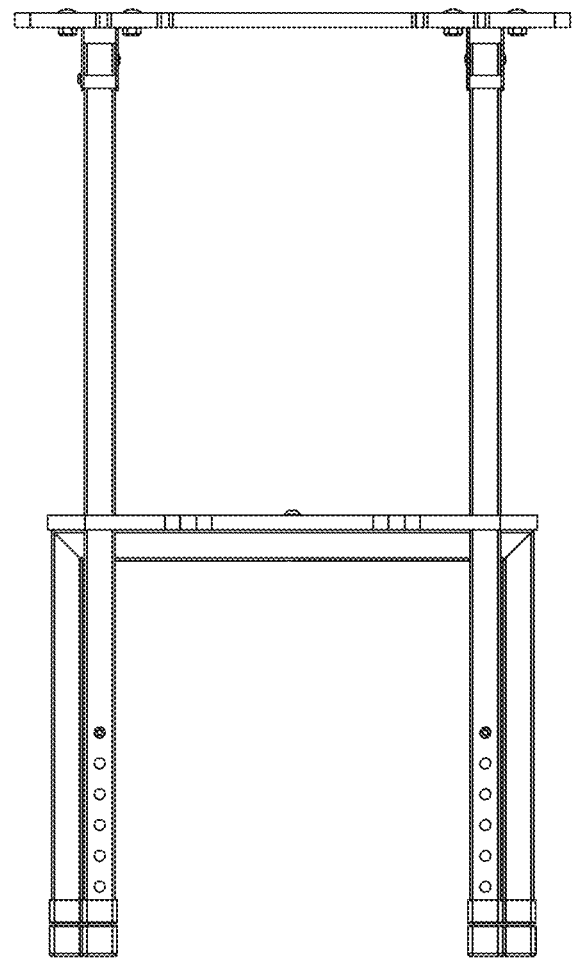
Figure 11D:
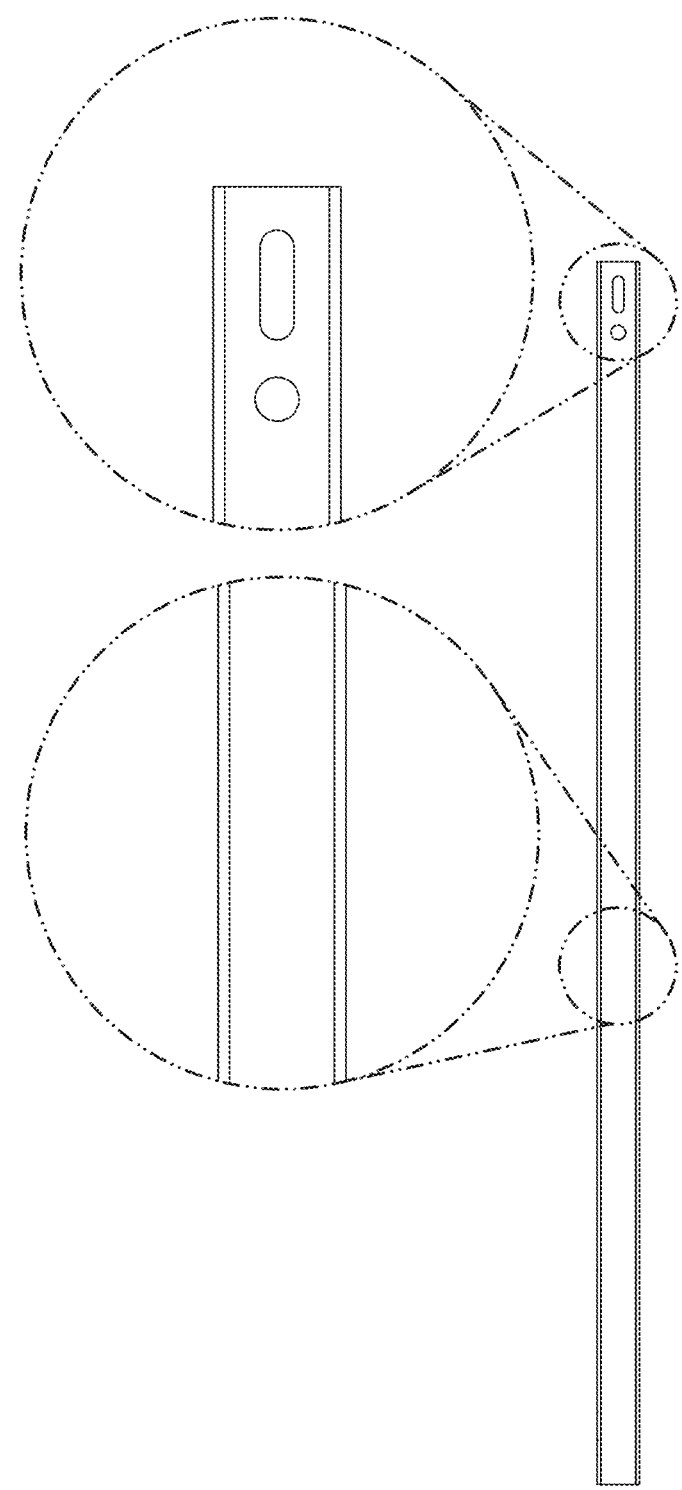
Figure 11E:
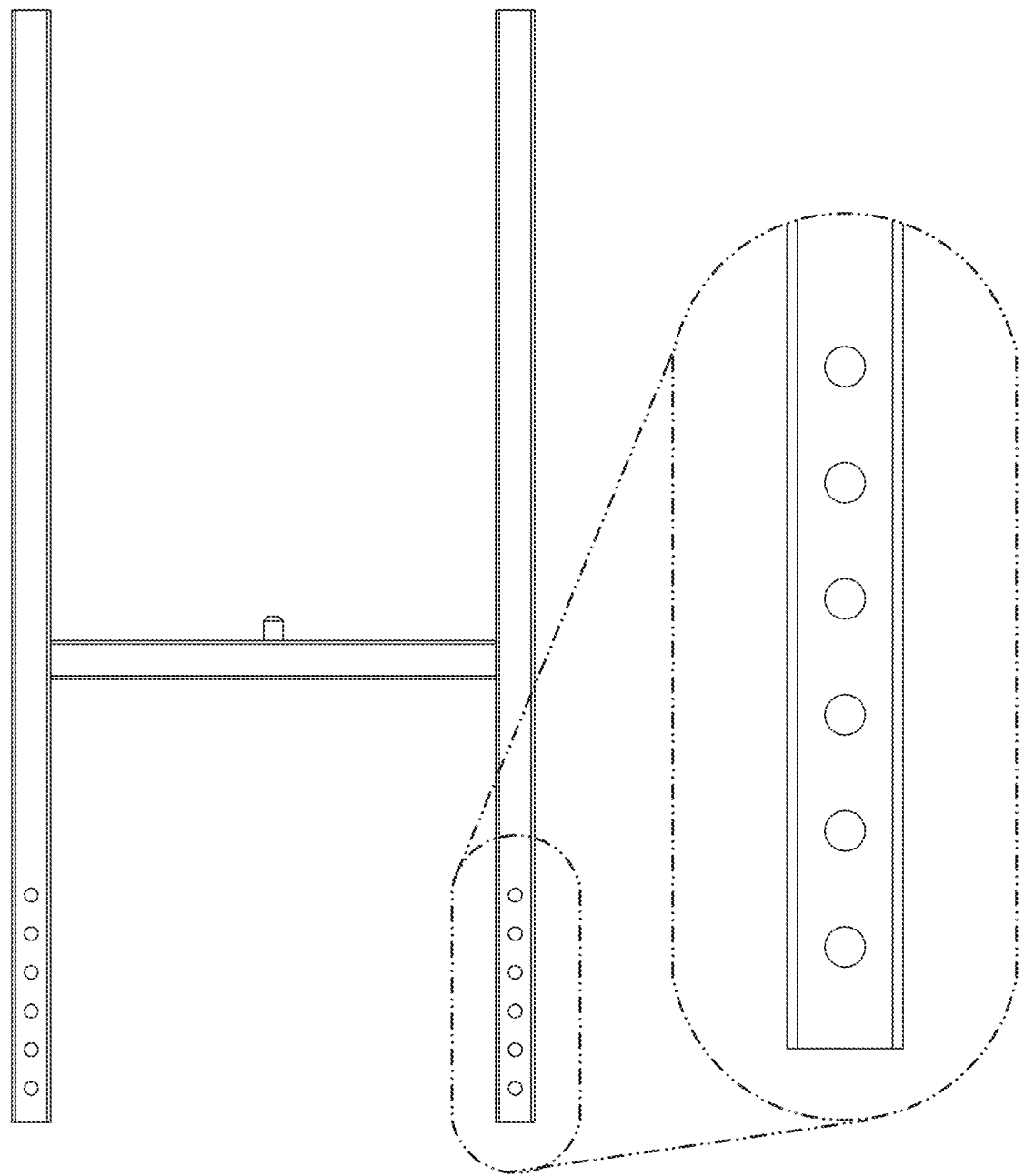
Figure 11F:
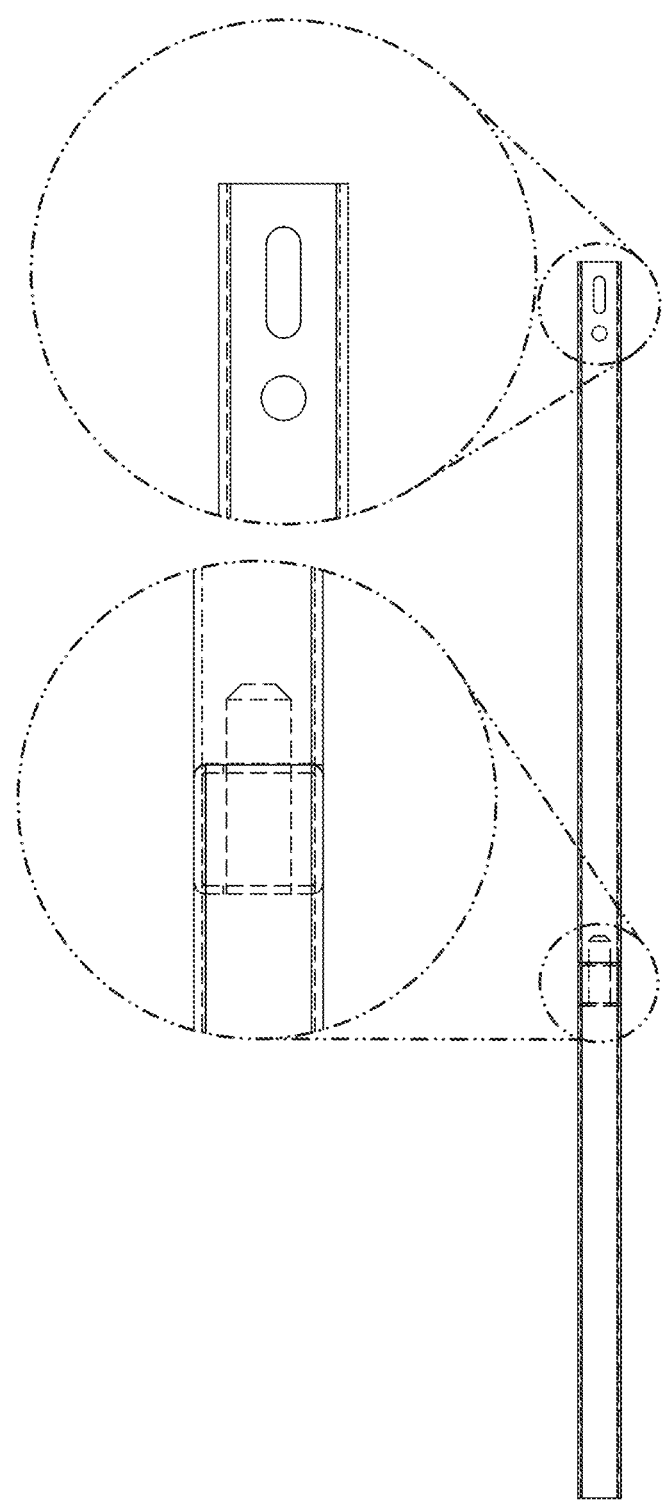
Figure 11G:
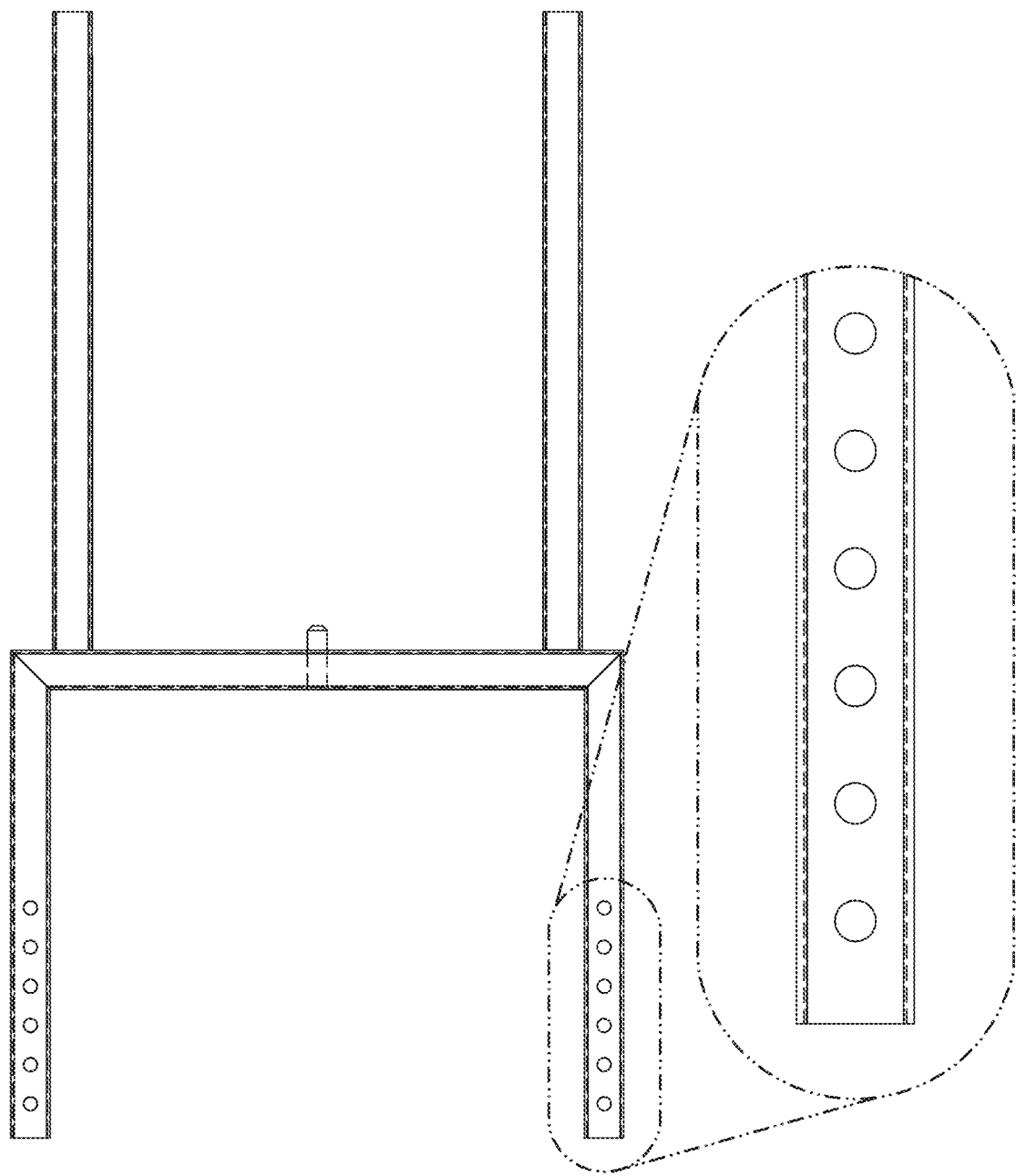
Figure 11H:
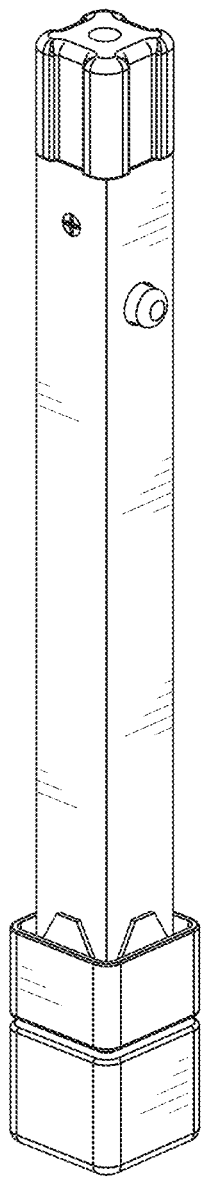
Figure 11I:
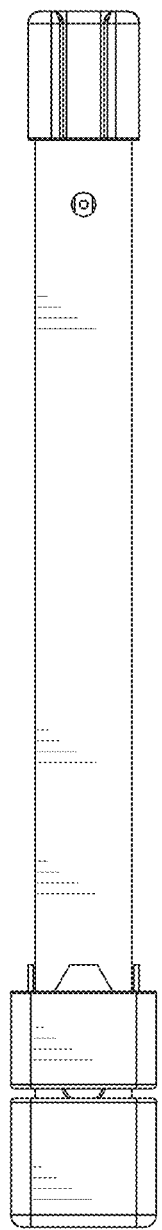
Figure 11J:
Figure 11K:
Figure 11L:
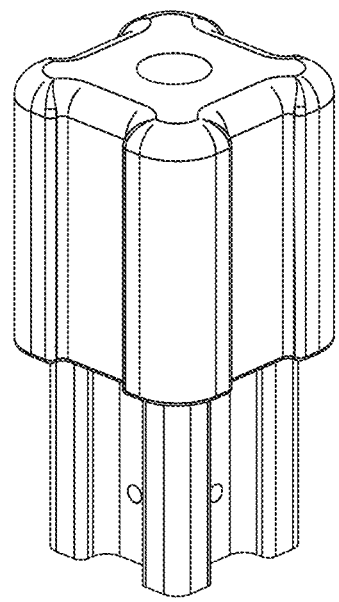
Figure 11M:
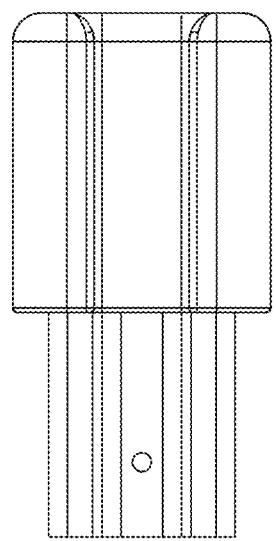
Figure 11N:
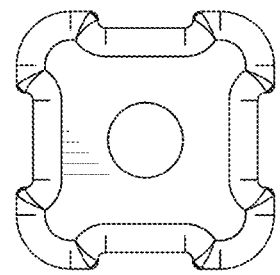
Figure 11O:
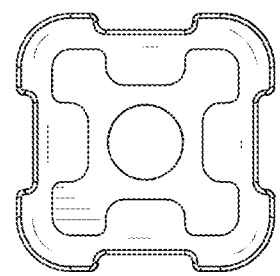
Figure 11P:
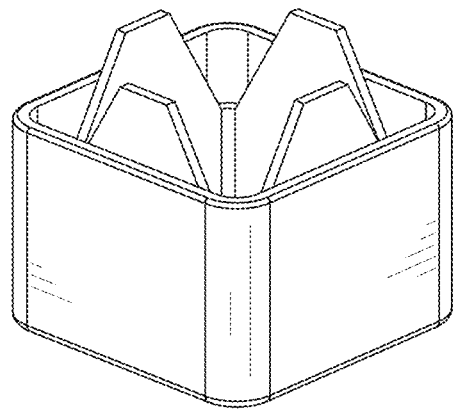
Figure 11Q:
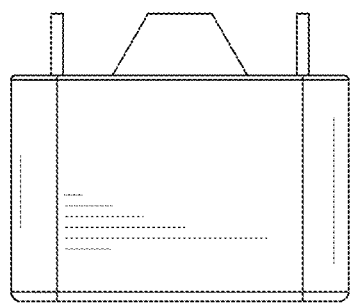
Figure 11R:
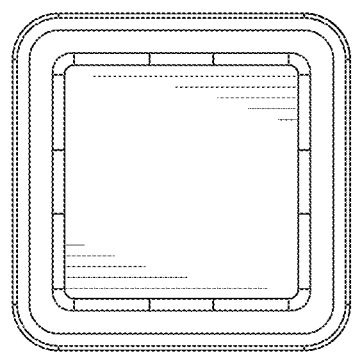
Figure 11S:
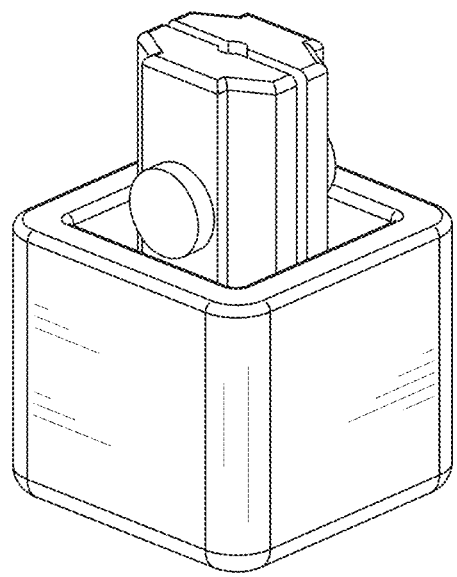
Figure 11T:
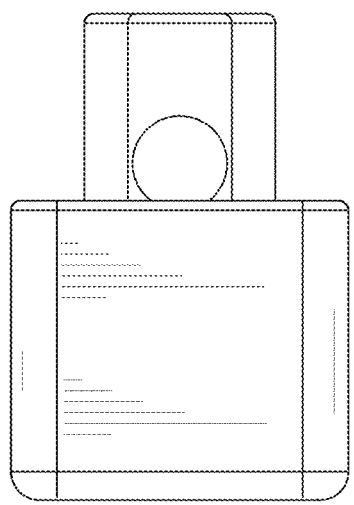
Figure 11U:
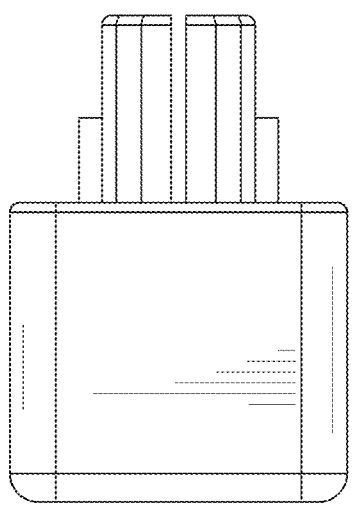
Figure 11V:
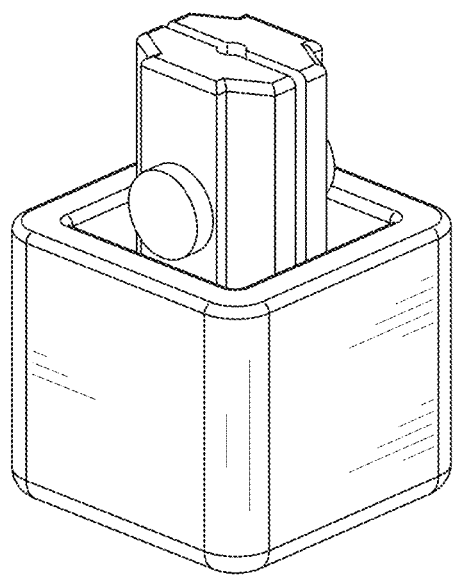
Figure 11W:
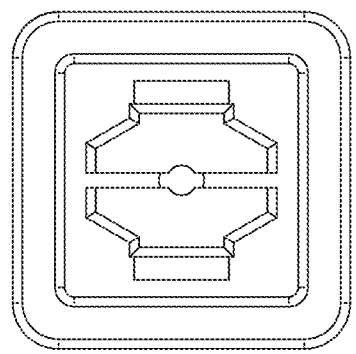
Figure 11X:
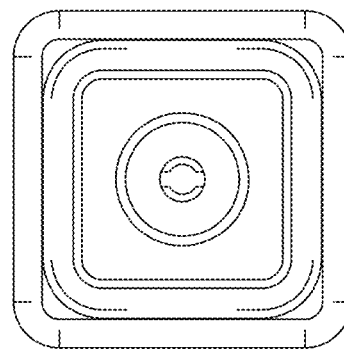
Figure 11Y:
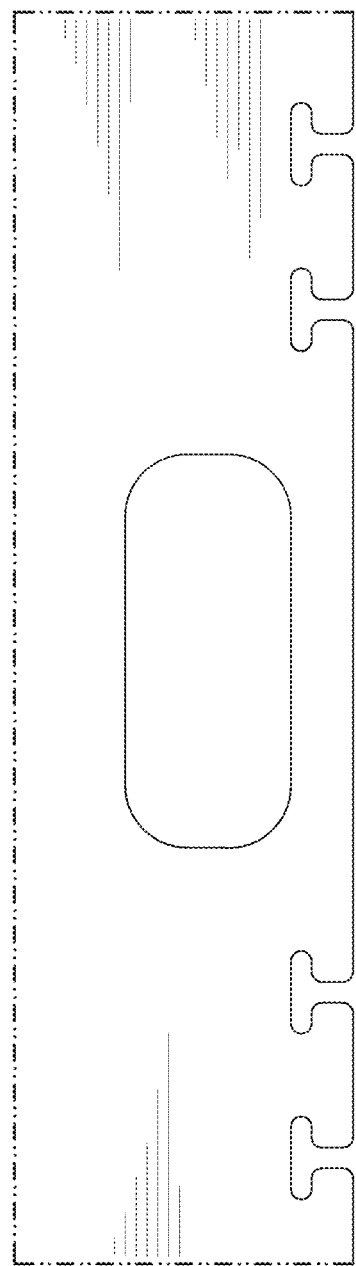

FIGS. 11A-11Y (collectively referred to herein as "FIG. 11") provide illustrations of components of the table shown in FIGS. 1-5.

FIGS. 12A-12G (collectively referred to herein as "FIG. 12") provide illustrations of a hinge according to the present solution.

Figure 13:
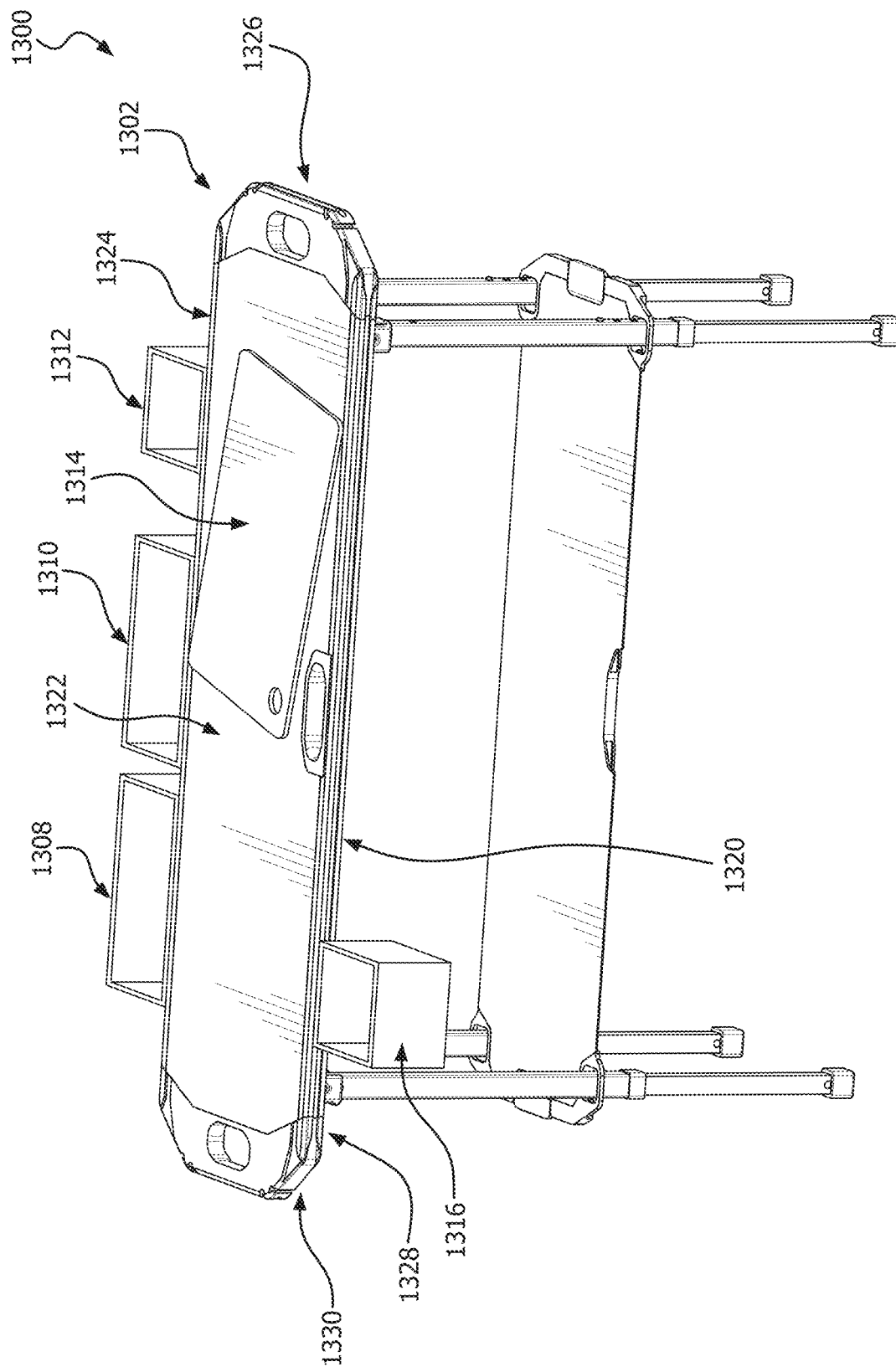

FIG. 13 provides an illustration of another table with accessories coupled thereto.

Figure 14:
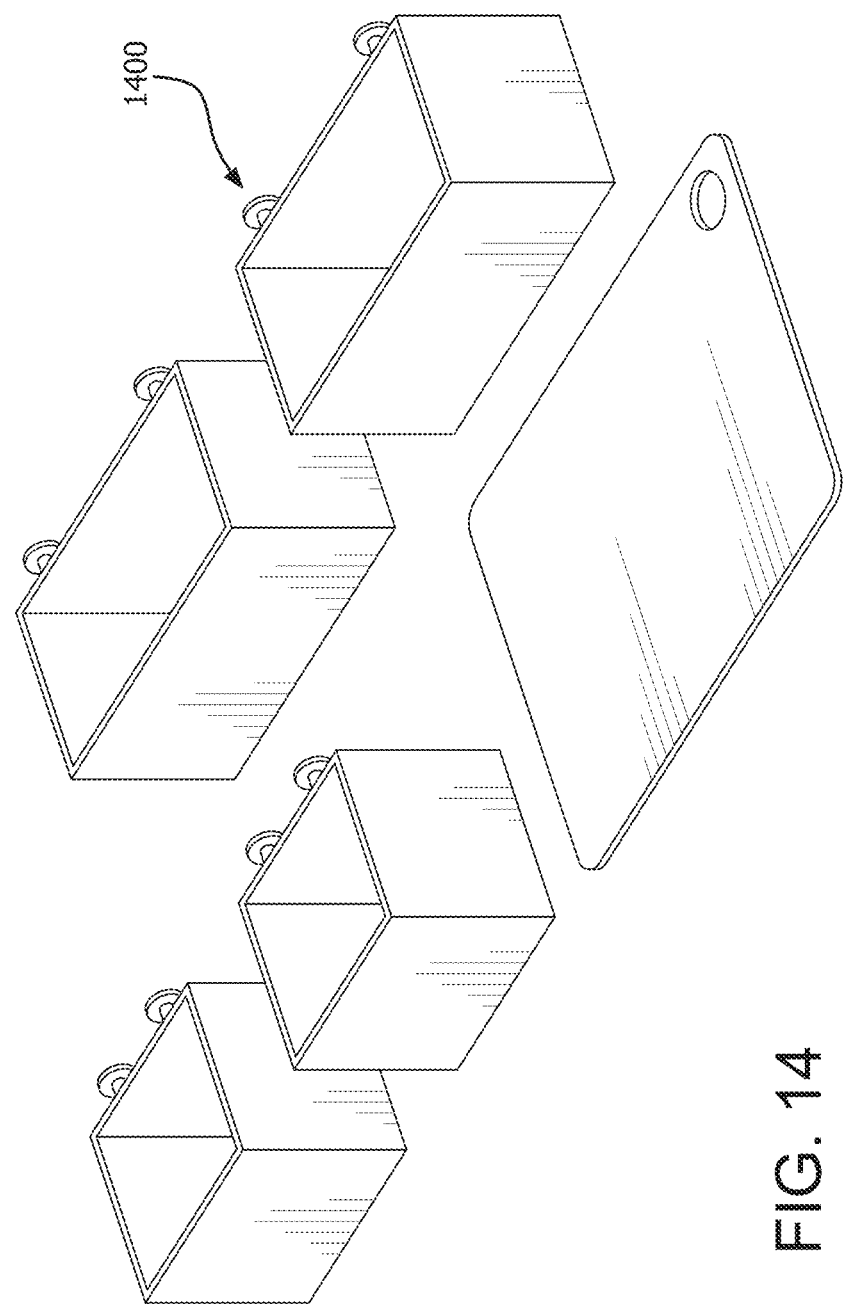

FIG. 14 provides an illustration of the accessories of FIG. 13 removed from the table.

Figure 15:
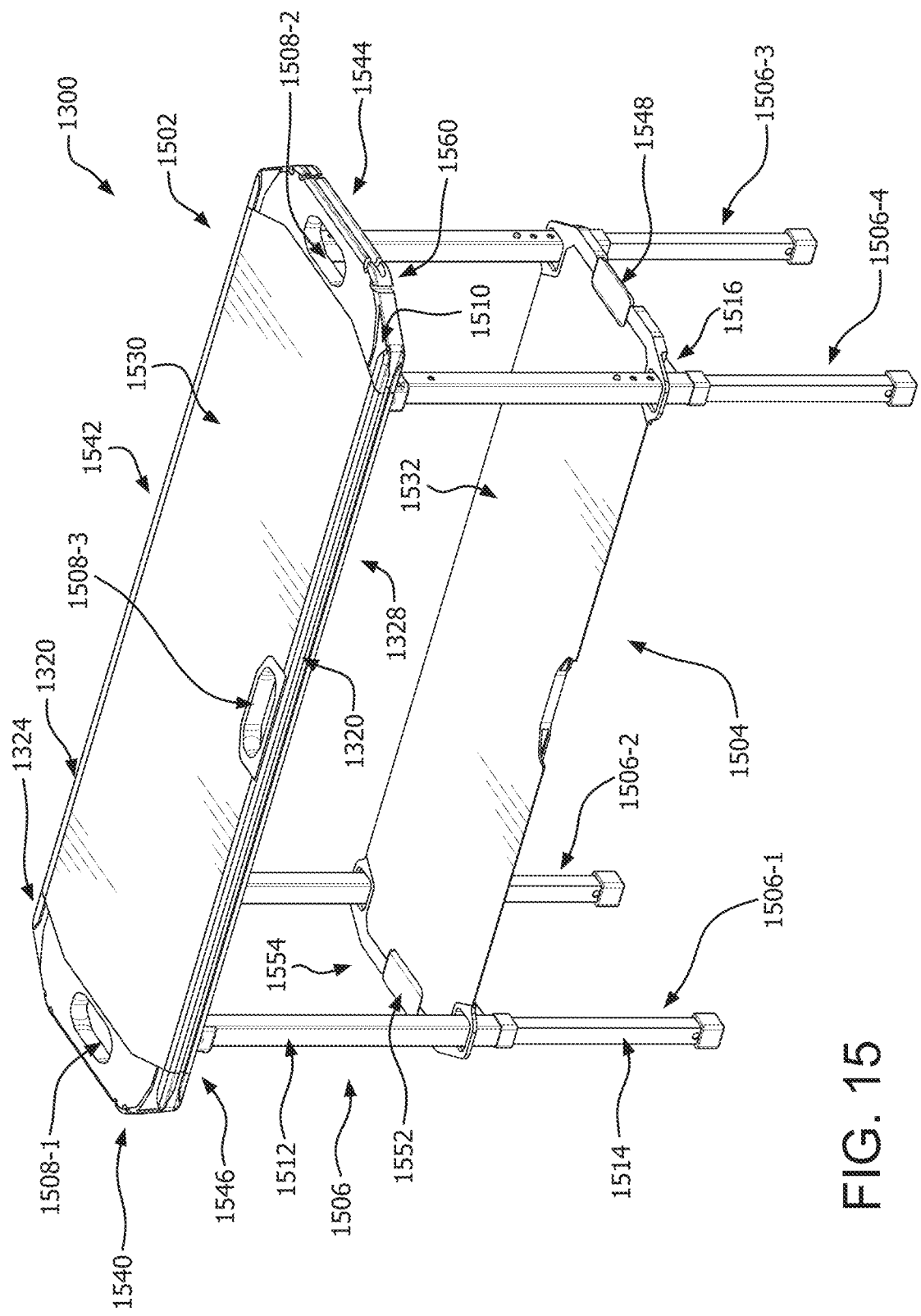

FIG. 15 provides a perspective view of the table shown in FIG. 13.

Figure 16:
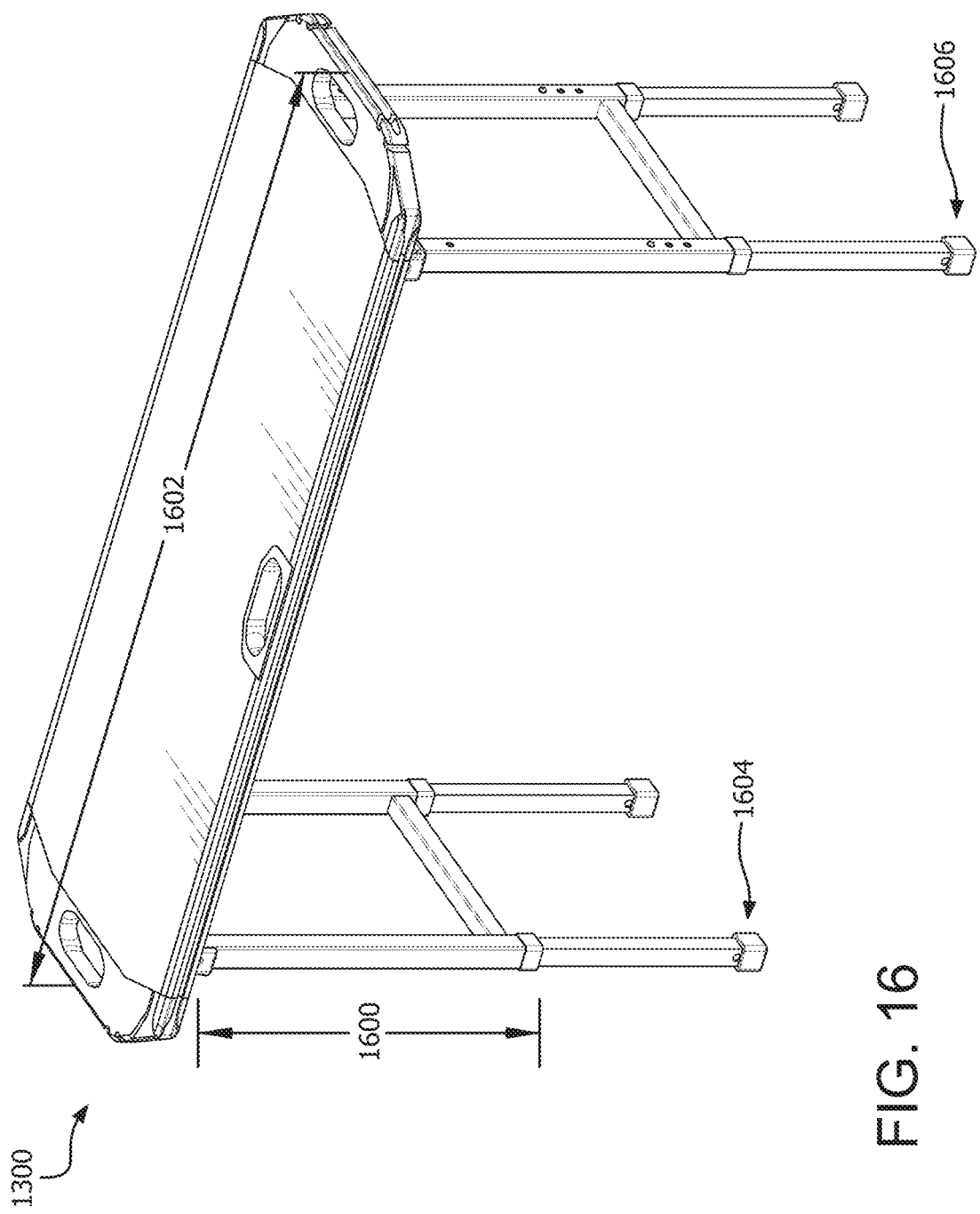

FIG. 16 provides a perspective view of the table shown in FIG. 13 with a middle shelf removed therefrom.

Figure 17:
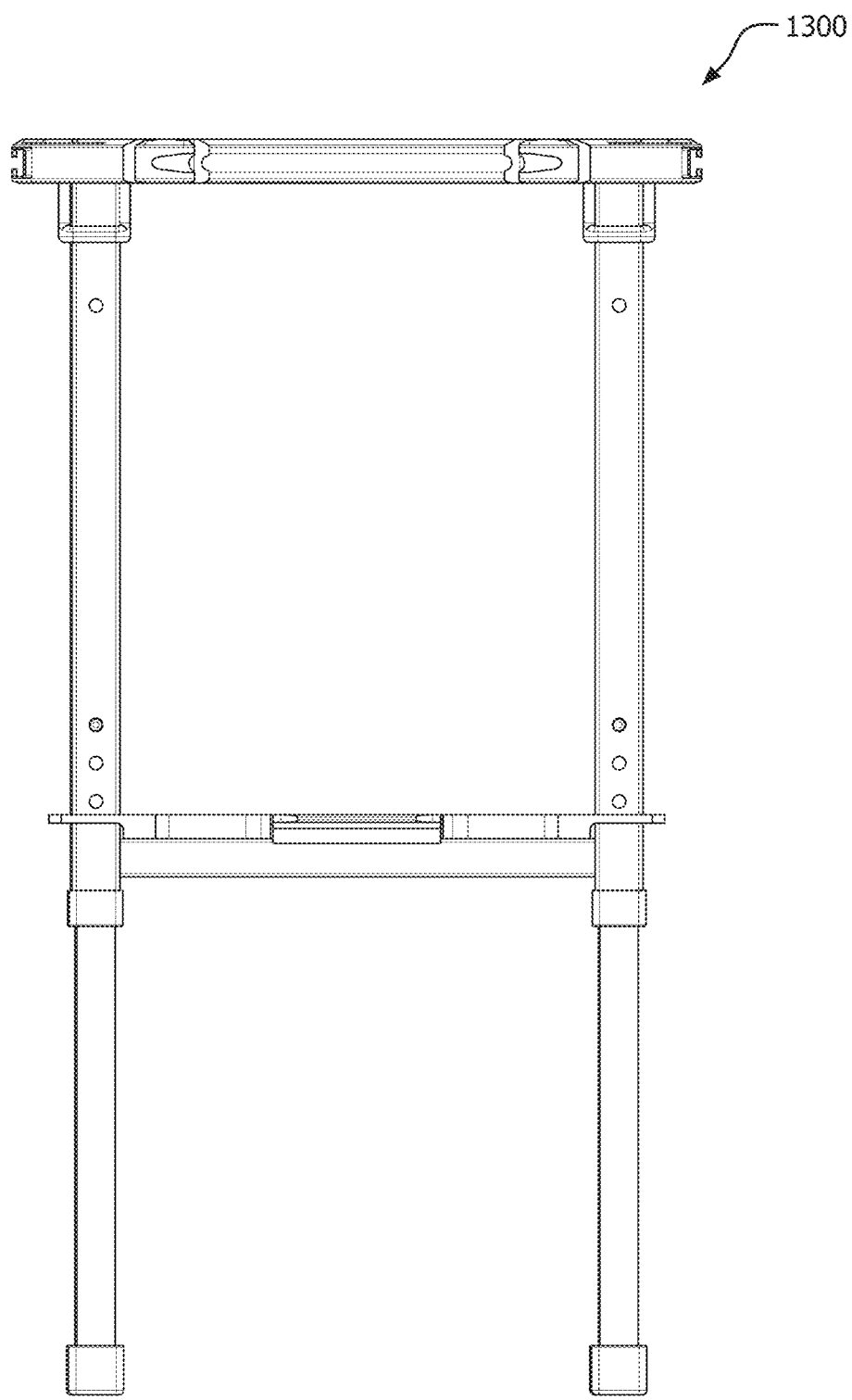

FIG. 17 provides a side view of the table shown in FIG. 13.

Figure 18:
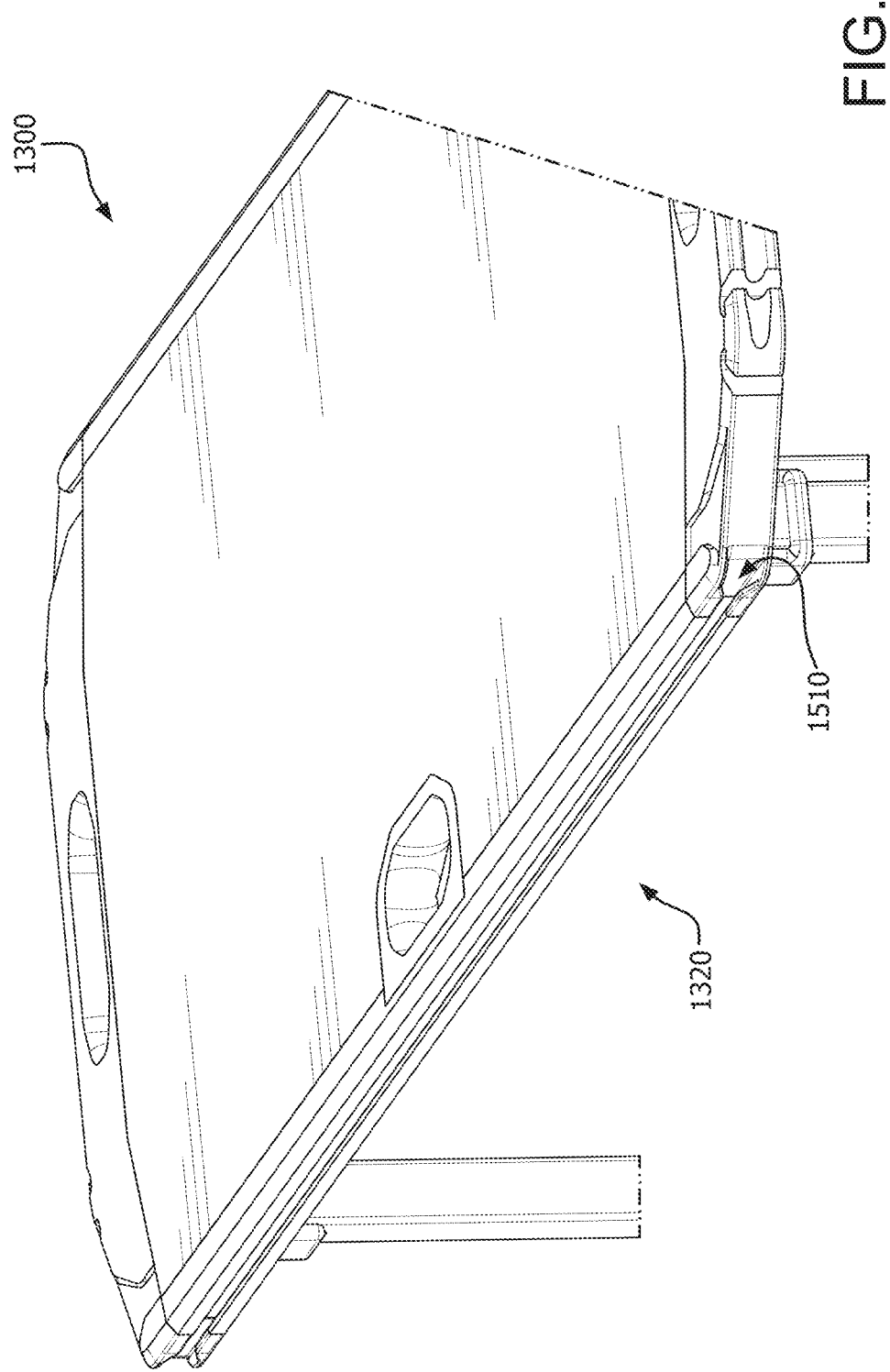

FIG. 18 provides a perspective view of a top portion of the table shown in FIG. 13.

Figure 19:
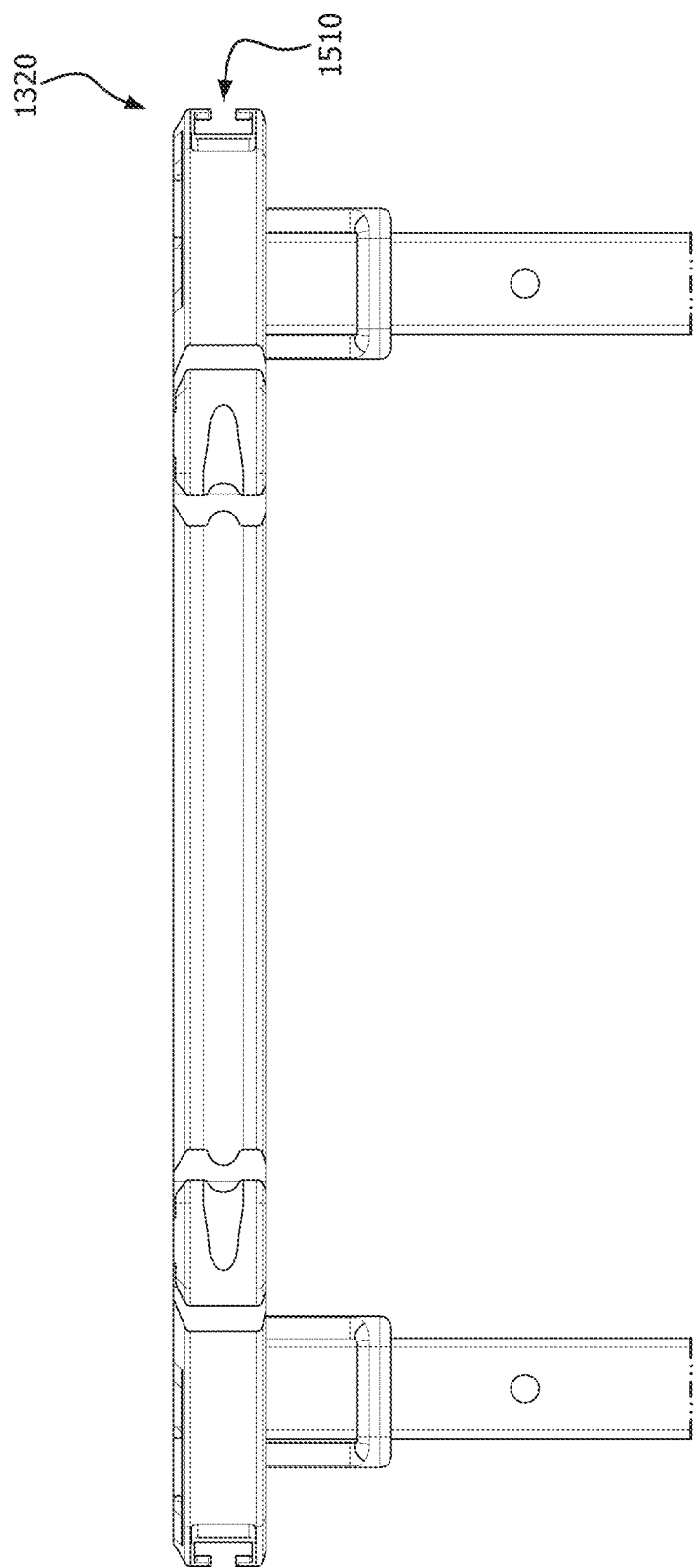

FIG. 19 provides a side view of a top portion of the table shown in FIG. 13.

FIGS. 20A-20B (collectively referred to herein as "FIG. 20) provide a flow diagram of an illustration method for operating a table.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns novel table configurations and methods of collapsing and/or expanding a table for storage. The present solution may include any combination of the features described herein. Embodiments described herein include a combination with all features present for the sake of easy of explanation. However, the embodiments of the current solution are not so limited. Each feature may be used in a table design by itself and not with other features, or may be used with any combination of features and remain within the scope of the invention. For example, a table described herein may include any combination of: a collapsible table, a non-collapsible table, a table comprising a top surface, a table comprising a lower shelf, a table having handles, a table having a top surface having one or more apertures therethrough, a table having indentations or contoured perimeter, a table having an exterior edge having one or more shaped indentations thereon, a table having a pivotable leg(s), a table having pivotable legs that are coupled in pairs to move together, legs having a cross beam thereon to support a lower shelf, the lower shelf configured to slide along the table legs, the legs pivotably coupled to an underside of the top surface, the pivotably coupled legs comprising a spring so that the legs are extended or pushed relative to a pivot in order to pivot and/or lock the legs relative to the top surface, telescoping legs, lockable legs, legs configured to translate relative to the top surface before being able to rotate to a collapsed configuration, top surface with overhung edge past legs with legs toward an interior so that the overhang can mate with a flanged holder (such as in the tail gate example but which can be used in other storage scenarios), and combinations thereof.

Although embodiments of the invention may be described and illustrated herein in terms of a table having all of the features possible, it should be understood that embodiments of this invention are not so limited, but are additionally applicable to tables have any subset of features described herein. Furthermore, although embodiments of the invention may be described and illustrated herein in terms of a rectangular table, it should be understood that embodiments of the invention are also applicable to other shapes, such as ovoid, square, circular, etc. and may also include various sizes.

The present solution may include a novel hinge configuration. The hinge permits the rotational movement of an extension portion at orthogonal angles. At the ends of the rotated positions (a first position and a second position, orthogonal to the first position), the extension is configured to be positioned within a body portion so that the extension portion is fully enclosed by the collar on all sides of the extension. In other words, the collar fully circumscribes an exterior perimeter of the extension. The extension is then configured to be moved relative to the body portion so that the extension is removed from the enclosure of the body portion and repositioned therein to be positioned in a second enclosure of the body portion. The hinge configuration may include, but is not limited to, locking mechanisms. For example, the hinge may include pins, spring pin, apertures, mated surfaces, hook-eye, etc. The novel hinge configuration can be used in other applications other than with a table as described herein.

Figure 1:
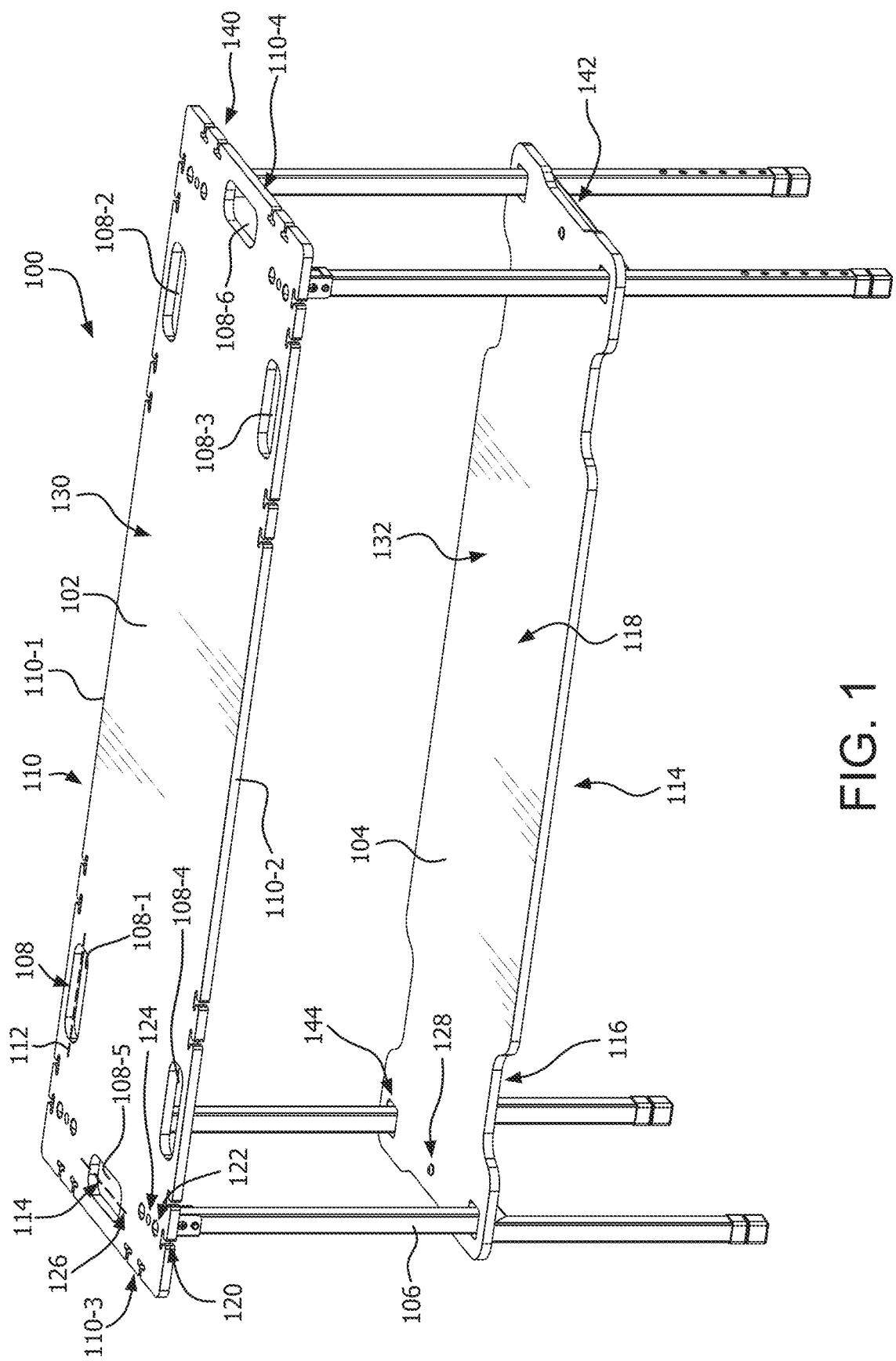
Figure 2:
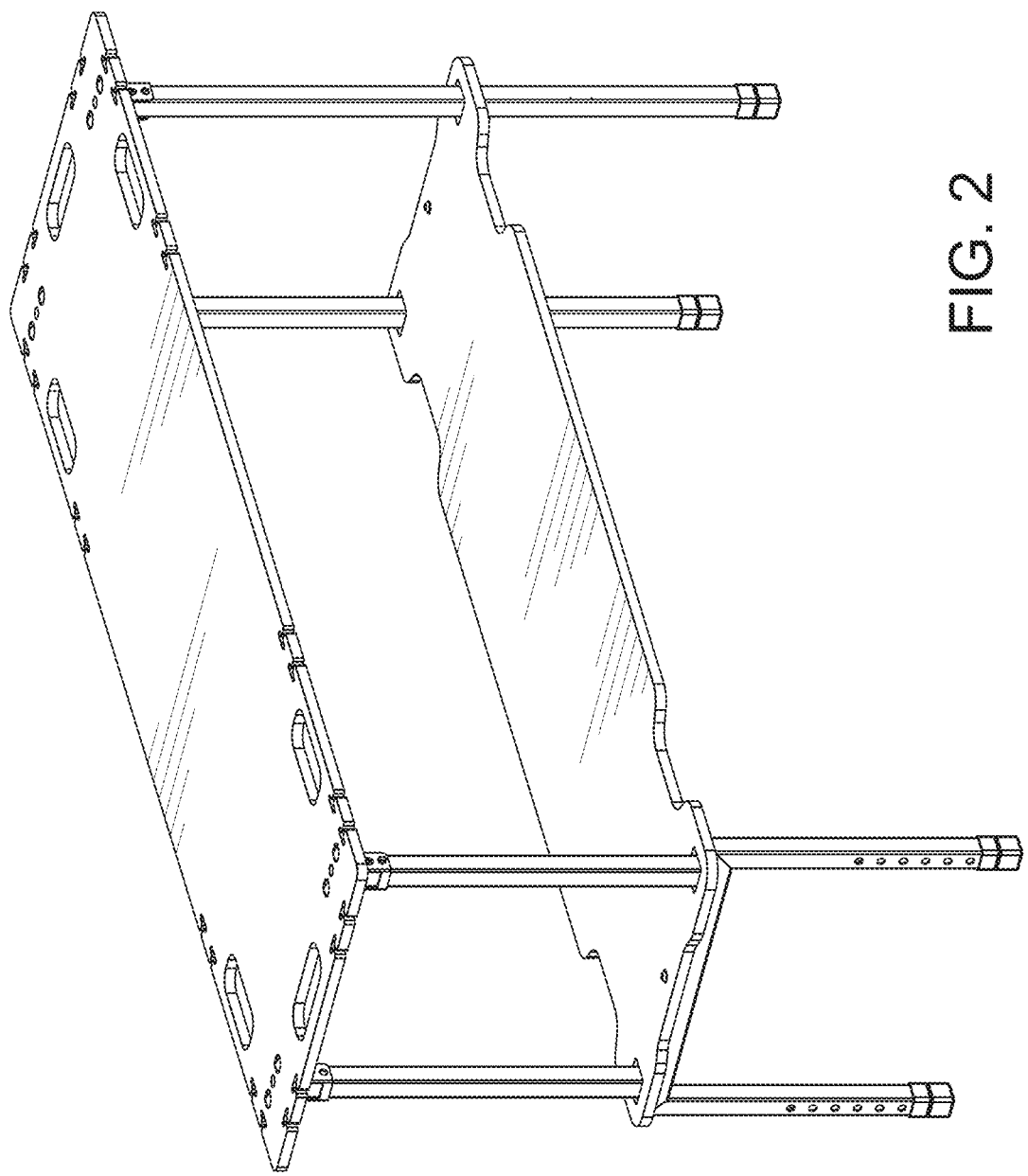
Figure 3:
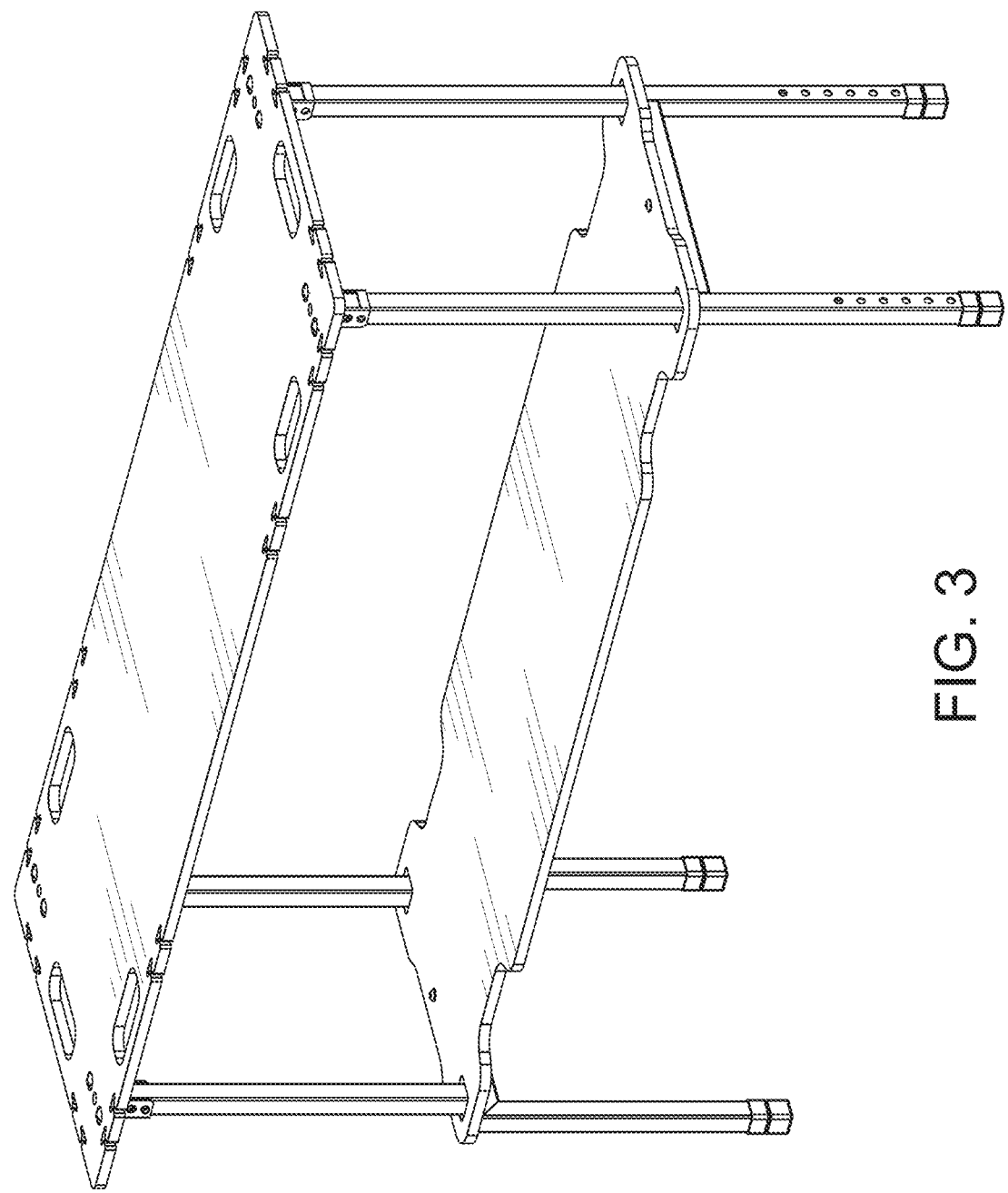

FIG. 1 provides an illustration of a table 100 according to the present solution. Table 100 has an upper part 102, a lower part 104, and four legs 106. The legs 106 (i) extend between the upper part 102 and the lower part 104, and (ii) extend past the lower part 104 to support the upper and lower parts 102, 104 above the ground, floor or other object therebelow.

The upper part 102 has aperture(s) 108 formed therethrough. The aperture(s) 108 are located adjacent to an outer perimeter of the upper part 102. Each aperture 108 may comprise an elongated hole with a longer dimension aligned with an edge 110 of the table to which the aperture is adjacent.

As shown in FIG. 1, the upper part 102 may include six large apertures 108-1, 108-2, 108-3, 108-4, 108-5, 108-6 formed therein to provide handles for gripping and moving the table 100. The present solution is not limited in this regard. Any number of apertures can be provided in accordance with any given application. Each aperture 108-1, 108-2, 108-3, 108-4 has a major axis 112 that extends parallel to a given long edge 110-1, 110-2 of the table. Each aperture 108-5, 108-6 has a major axis 114 that (i) extends parallel to a given short edge 110-3, 110-4 of the table and (i) extends perpendicular to the long edges 110-1, 110-2 of the table. The apertures are illustrated as curved rectangular or ovoid holes within the upper part 102. The present solution is not limited in this regard. The apertures may have other shapes such as rectangular, square, etc. The apertures may be fully enclosed by the upper part 102 as shown, or alternatively only partially enclosed by the upper part 102 (not shown). For example, the apertures may comprise a "T" opening from the perimeter edge of the table, or some other shape or configuration.

The lower part 104 may be used to define a shelf or second layer of the table 100. The lower part 104 may be separated from the upper part 102 to define two separate supporting structures for the table 100. The lower part 104 has a perimeter shape which approximates the perimeter shape of the upper part 102. The approximation may be the same shape as the upper part 102 with variations thereto, such as having different indentations from those of the upper part 102. For example, the upper part 102 and lower part 104 may be generally rectangular, square, circular, ovoid, etc.

As illustrated, the lower part 104 may include a contoured outer perimeter 114. The contouring may include indentations 116 within the outer perimeter such that portions of the outer perimeter extend inward toward the middle 118 of the lower part 104. The indentations 116 may align with the apertures 108 of the upper part 102. Therefore, when viewed from above, or when the upper part 102 is positioned vertically adjacent to the lower part 104, the indentations 116 of the lower part 104 align with the apertures 108 of the upper part 102 so that the apertures of the upper part are not obstructed by any structure of the lower part 104. This (i) allows objects (not show) to pass through the apertures 108 the upper part 102 to the ground without being obstructed by the lower part 104, and (ii) allows the apertures 108 to be used as handles when the table is either an expanded configuration or a collapsed configuration.

An inside portion of each indentation 116 may approximate an inside portion of a respective aperture 108 of the upper part 102 so that the inside edge of the respective aperture and the inside edge of the indentation are parallel or aligned when the upper part 102 is in contact with the lower part 104. Each indentation 116 may extend inward of the lower part 104 to a greater extent than the respective aperture 108 of the upper part 102. Therefore, the upper part 102 may create a flanged edge relative to the lower part 104 when the lower part and upper part are in contact with each other. In other words, an inside edge of the respective aperture may extend further away from a center axis perpendicular from the point of measurement on the top part than an inside edge of the indentation corresponding to the aperture of the upper part measured from the center axis on the lower part corresponding (or aligned with) at a point corresponding with the point on the center axis aligned with the measurement point from the upper part. The indentations on the lower part are flared outward so that the length of the indentation (the gap or distance between perimeter edges) at the outermost perimeter is greater than at the indentation toward the middle of the lower part.

Other apertures 120, 122, 124, 126, 128 may be provided on the upper part 102 and/or lower part 104. The apertures 120-128 may be configured to assist with carrying the table 100, securing the table 100 in a stowed or collapsed configuration, and/or provide accessory holders. These apertures may comprise different shapes and may be openings provided at any location on the table 100. One or more of the apertures 108, 120-126 may be provide a bottle opening or hook. The accessories can include, but are not limited to, T-Slot rack extensions for wall mounts in truck beds, a plate carrier, a utensil carrier, a drying rack, a cup holder, storage bins, a bottle opener, and/or hooks (e.g., for hanging bags or other items).

For example, apertures 120-126 may be used as attachment points for accessories and other objects. In this way accessories and other objects can be removably attached to the table 100 via hooks, hangers and/or other mechanical couplers.

Apertures 120 may have a generally T-shape formed by two parallel extending slots formed through the table. The present solution is not limited in this regard. The apertures can have other shaped selected in accordance with a given application. For example, one or more apertures 120 can alternatively have a Y-shape.

Apertures 122, 124, 126, 128 can each include a single hole or slot sized and shaped to receive at least a portion of an external accessory or other object. Two or more apertures 122, 124, 126 may be located adjacent to, near or proximate each other to form a set or group of apertures. The set or group of apertures may be sized, shaped and have relative locations to accommodate at least a portion of a multi-prong coupling structure of an external accessor or object.

Aperture 128 may provide a means for securing the lower part 104 to the leg assembly. For example, a pin 800 (shown in FIG. 8) can be provided with the leg assembly for insertion into the aperture 128 when the lower part 104 is adjacent to cross bars of the leg assembly. The pin 800 will slide out of aperture 128 when the lower part 104 is lifted or otherwise moved towards the upper part 102.

In FIG. 1, table 100 is shown in an expanded configuration with the upper part 102 providing a generally flat tabletop surface 130 extending parallel to a flat top surface 132 of the lower part 104. The flat top surface 132 of the lower part 104 is spaced apart and separated from the tabletop surface 130 so that two supporting levels 140, 142 are created for supporting different objects at different vertical levels relative to ground. The two supporting levels 140, 142 are coupled to each other via legs 106.

Legs 106 extend from a bottom side of the top supporting level 140 towards the bottom supporting level 142. The legs 106 pass through apertures 144 formed in the lower part 104. The legs 106 and apertures 144 are designed to allow the bottom supporting level 142 to sliding move towards and/or away from the top supporting level 140.

Part of the table 100 may be describe herein as being aligned with each other. The alignment of the parts may be in relation to an orientation when the parts are in a deployed or expanded configuration or when viewing the table from above. The alignment may also or alternatively be in relationship to a stowed or collapsed configuration when the upper part 102 is adjacent to and/or in contact with the lower part 104 and/or when the legs 106 are collapsed.

Figure 4:
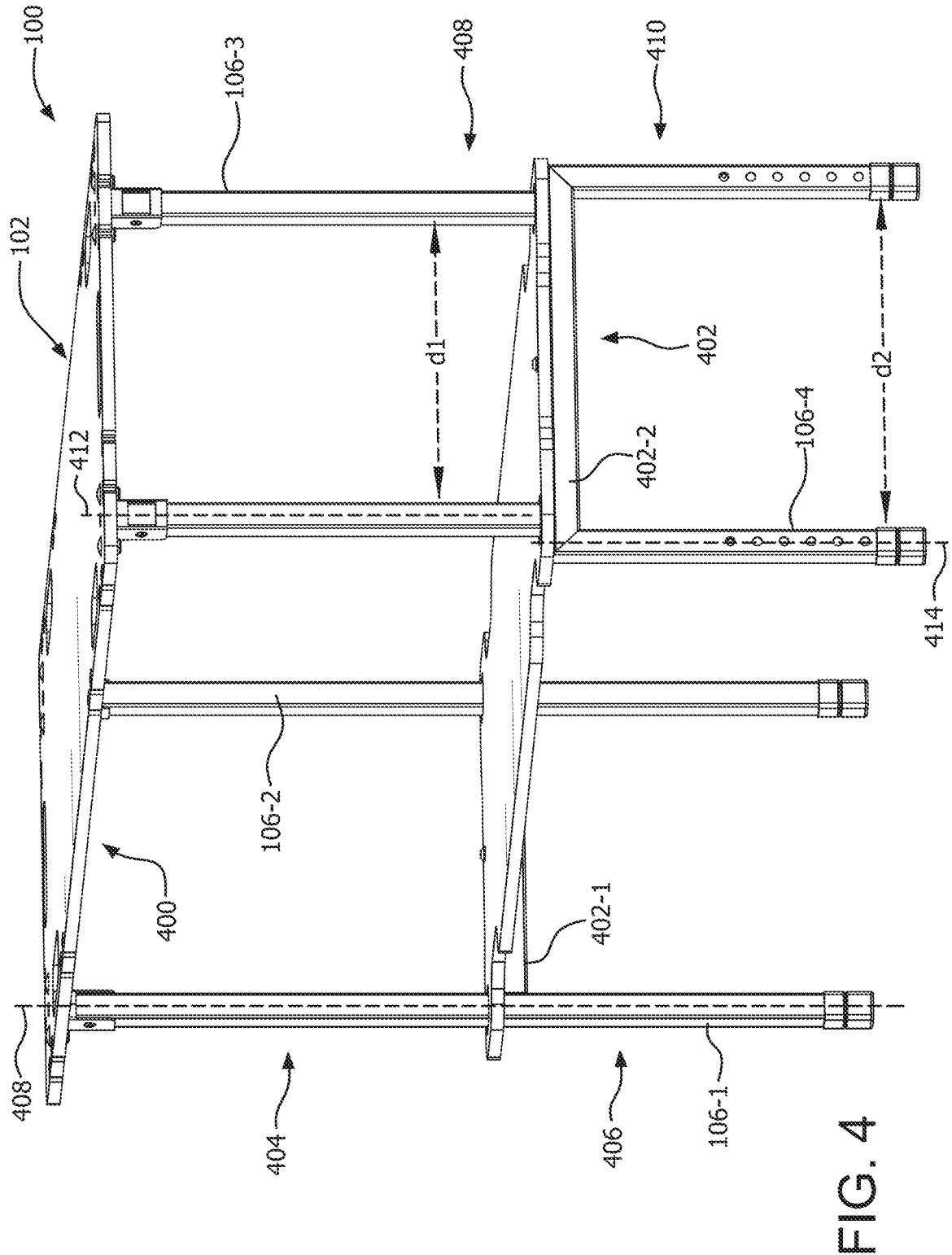

FIG. 4 provides an illustration in which the structure of the legs 106 is more visible. Legs 106 may occur in pairs and be coupled together. For example, legs 106-1 and 106-2 provide a first pair of legs, while legs 106-3 and 106-4 provide a second pair of legs. Each pair of legs is attached to a bottom surface 400 of the upper part 102. This coupling can be achieved via mechanical couplers. The mechanical couplers can include, but are not limited to, brackets, screws, nuts, and adhesives.

Each leg 106-1 and 106-2 has a first straight portion 404 and a second straight portion 406. The first and second portions 404, 406 have center axes 408 that are aligned with each other as shown in FIG. 4.

Each leg 106-3 and 106-4 also has a first straight portion 408 and a second straight portion 410. The first and second portions 408, 410 of each leg have center axes 412, 414 that are offset from each other as shown in FIG. 4. As such, the distance d1 between top portions of legs 106-3 and 106-4 is less than the distance d2 between bottom portions of legs 106-3 and 106-4.

The legs of each pair are coupled to each other view a cross bar 402. For example, legs 106-1 and 106-2 provide a first pair that are coupled to each other via cross bar 402-1, while legs 106-3 and 106-4 of the second pair are coupled to each other via cross bar 402-2. Each cross bar extends between the two legs of the respective pair. The top portion 408 of each leg 106-3, 106-4 is coupled to the cross bar 402-2 at a different location than the location along the cross bar at which the bottom portion 410 is coupled.

The cross bars 402 may be configured to structurally support the lower part 104 when the table 100 is in its deployed or expanded configuration shown in FIG. 4. The cross bars 402 are located at a location along the legs to maintain the lower part 104 a certain distance from the upper part 102 when they are being used to structurally support the lower part 104. The cross bars 402 may also be configured to act as a stop for the sliding movement or translation of the lower part 104 away from the upper part 102.

FIG. 5 provides a bottom view of the table 100 in the deployed or expanded configuration. In the deployed or expanded configuration, the upper part 102 is separated from the lower part 104 and the legs 106 are perpendicular to the upper and lower parts. The lower part 104 may be resting on a cross bars 402 of the leg pairs.

One or more locks may be provided to secure the lower part 104 to the cross bar(s). The lock(s) may (i) prevent the lower part 104 from sliding along the legs 106 towards the upper part 102 when the table is turned upside down as illustrated in FIG. 5, and/or (ii) prevent the lower part 104 from unintentionally sliding along the legs 106 and/or contacting the upper part 102 and potentially pitching figures or otherwise hurting user(s). The lock(s) can include any known or to be known lock mechanism. The lock mechanical can include, but is not limited to, a protrusion, a button, a hook, and/or a roughened surface. In the button scenario, the button may extend out of the leg 106 above a top side of the lower part 104 that creates a structure preventing the lower part 104 from moving past a certain point along the legs. The button may be spring loaded so that when pushed by a user it at least partially moves into the leg 106. In this way, the button can be actuated to selectively prevent the lower part 104 from sliding towards the upper part 102 and/or selectively allow the lower part 104 to slide further towards the upper part 102. The present solution is not limited to the particulars of this example.

A pin may extend from the cross bar 402 of at least one pair of legs. The pin may provide a frictional engagement with an indentation on the lower part 104 so that the user can push the lower part 104 towards the upper part 102 to disengage the lower part 104 from the pin, whereby the lower part 104 can be moved towards the upper part 102. The lower part 104 may also include a shaped aperture. In this scenario, the pin includes a top portion having a shape corresponding to the shape of the aperture. The pin may rotate or otherwise be manipulated to align the pin with the aperture and permit the pin to pass by and through the aperture. The pin may also rotate or otherwise be manipulated to misalign the pin with the aperture such that the edge of the aperture of the lower surface contacts and engages the shape of the upper part 102 of the pin and prevents the upper part 102 from passing past the pin.

FIG. 6 provides a bottom view of the able 100 in the stowed or collapsed configuration. In the stowed or collapsed configuration, the lower part 104 is parallel and adjacent to and/or in contact with upper part 102. The legs 106 are parallel to the upper and lower parts 102, 104. The legs 106 may be in contact or adjacent to the lower part 104. The legs 106 may be rotated generally perpendicular from the orientation of the legs 106 in the expanded configuration.

The lower part 104 may have the same or similar shape as that of the top surface such that they appear to at least partially or fully overlap each other when viewed from above or below. In some scenarios, the lower part 104 may be smaller than the upper part 102. The difference in size may permit the upper part 102 to define an overhang or flanged edge with respect to the lower part 104 when the lower part 104 is positioned next to and/or in contact with the upper part 102. In FIG. 6, the lower part 104 is smaller than the upper part 102 such that the upper part 102 overhangs the entire perimeter of the lower part 104. The present solution is not limited in this regard.

As seen in FIG. 6, the legs 106 may fold together under the lower part 104 when the lower part 104 is positioned adjacent the upper part 102. In the folded position, the legs 106-1, 106-2 overlap vertically with legs 106-3, 106-4. However, legs 106-1, 106-2 may or may not be in contact with legs 106-3, 106-4.

FIGS. 7A-7D provide illustrations that are useful for understanding how table 100 transitions from a deployed or expanded configuration to a stowed or collapsed configuration. First, the lower part 104 is moved toward the upper part 102 as shown by arrows 700 in FIG. 7A. A lock may be unlocked to allow movement of the lower part 104. Once unlocked, the lower part 104 may then be slid along the legs 106 toward the upper part 102. If the table 100 is upside down, gravity may be used to facilitate movement of the lower part 104 towards the upper part 102.

Figure 7A:
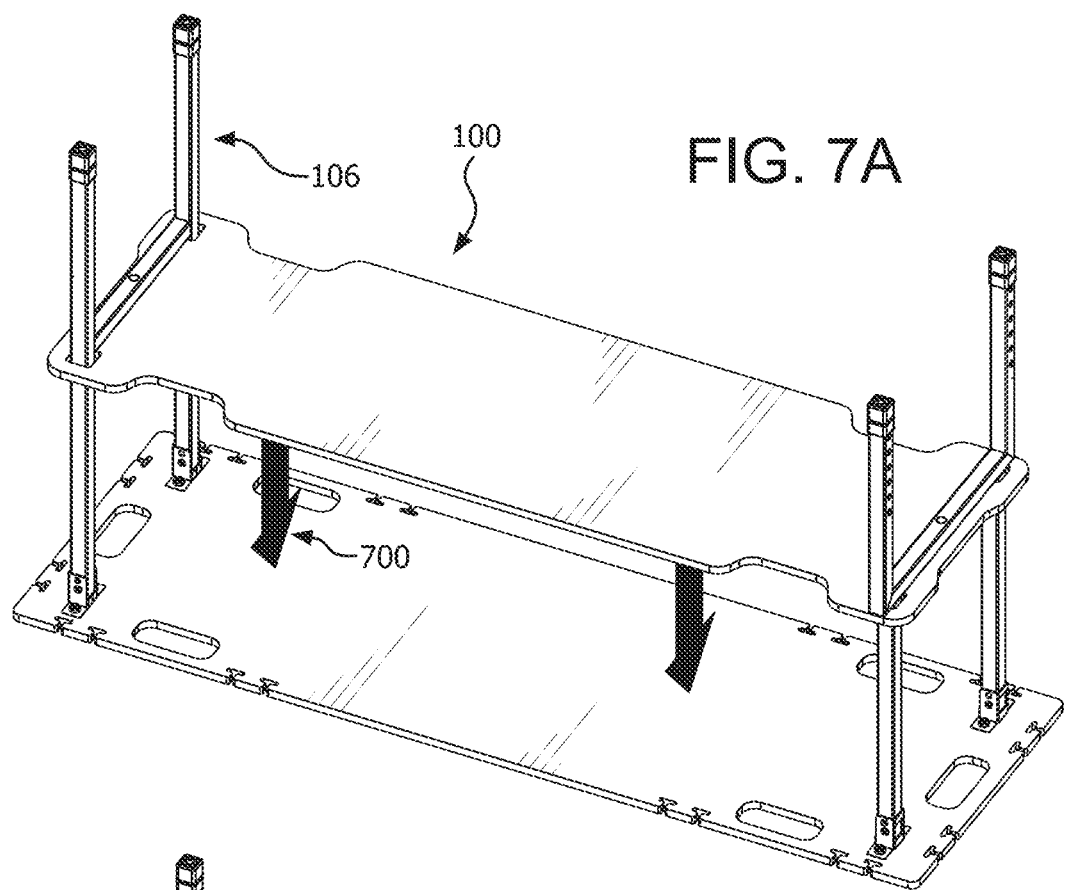
Figure 7B:
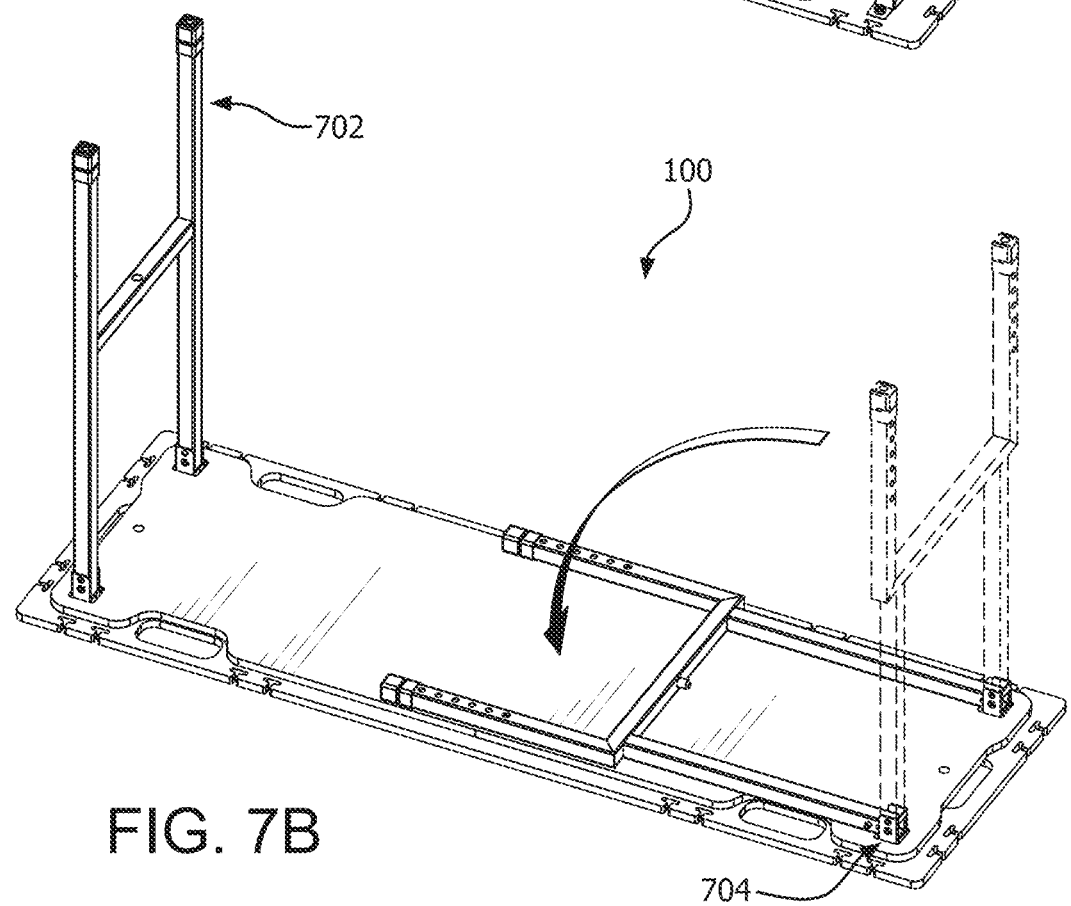
Figure 7C:
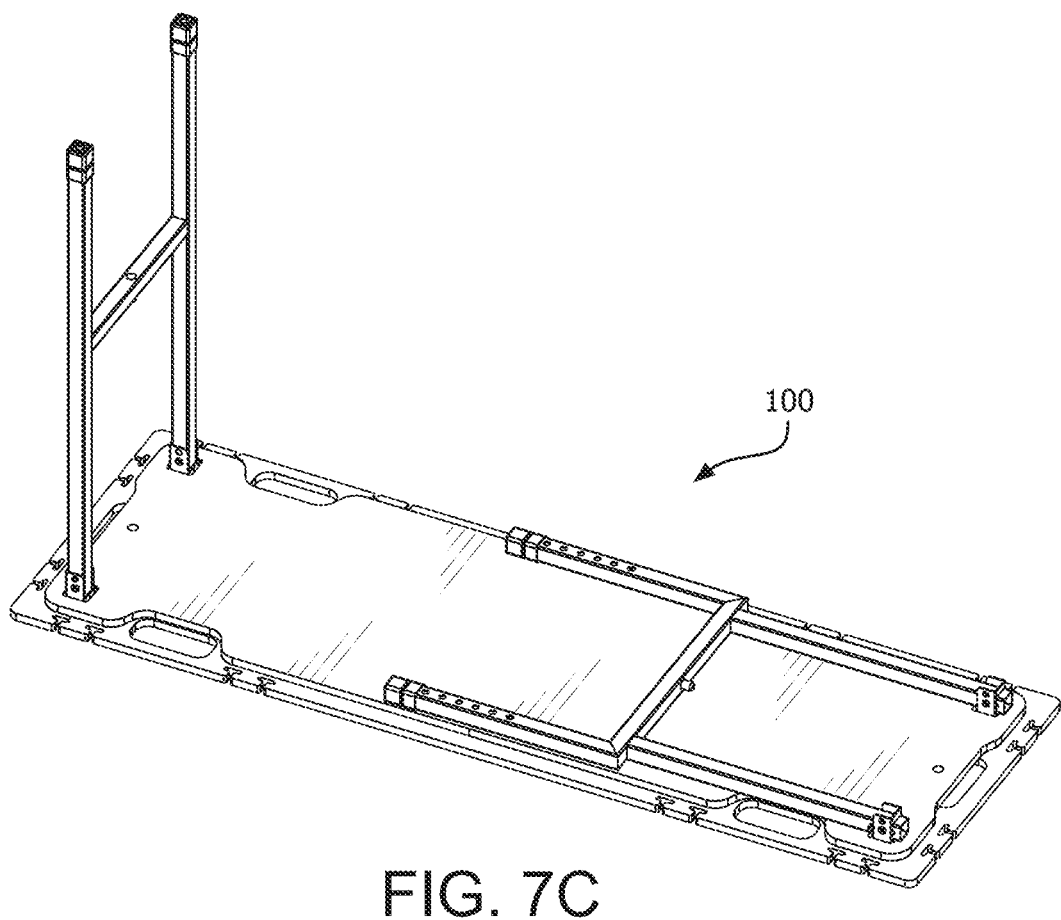
Figure 7D:
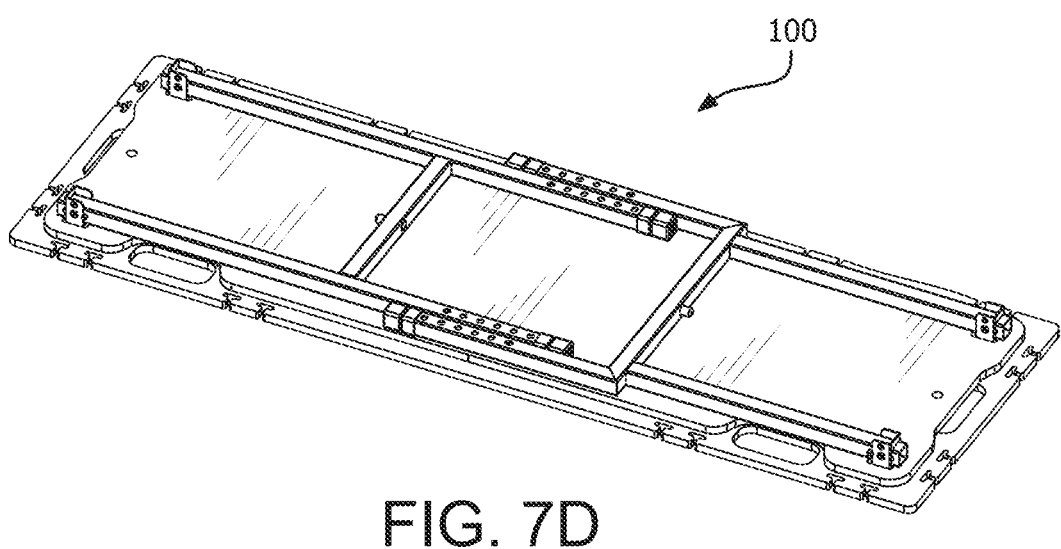
Figure 8E:
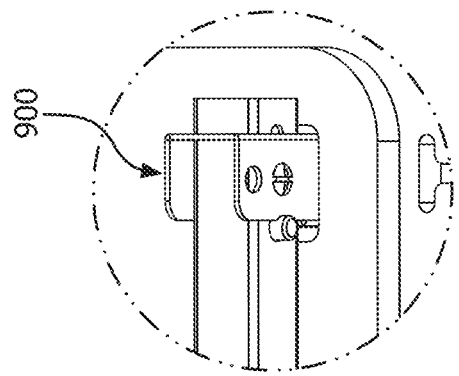
Figure 8D:
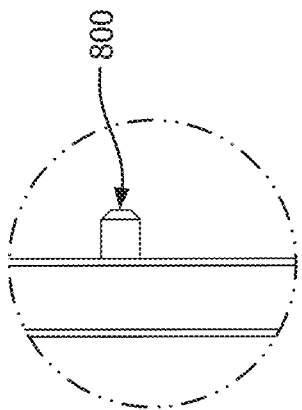
Figure 8C:
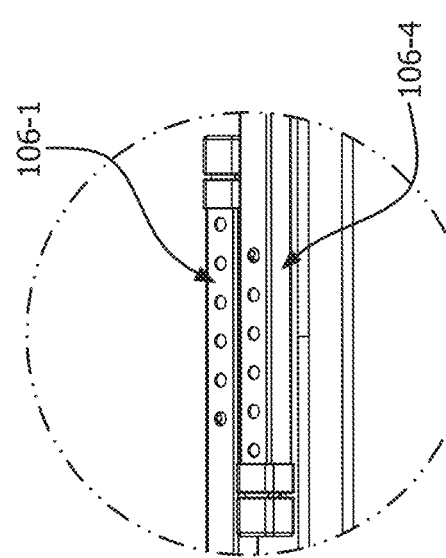
Figure 8B:
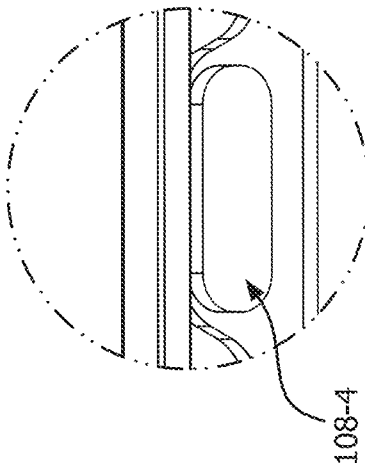
Figure 8A:
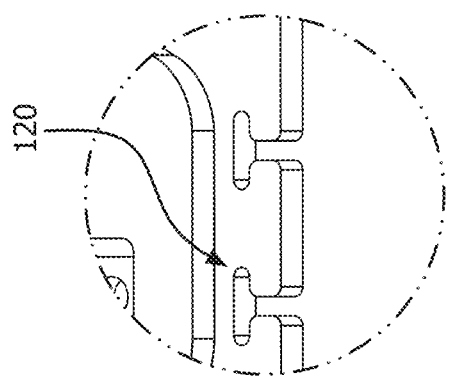
Figure 8F:
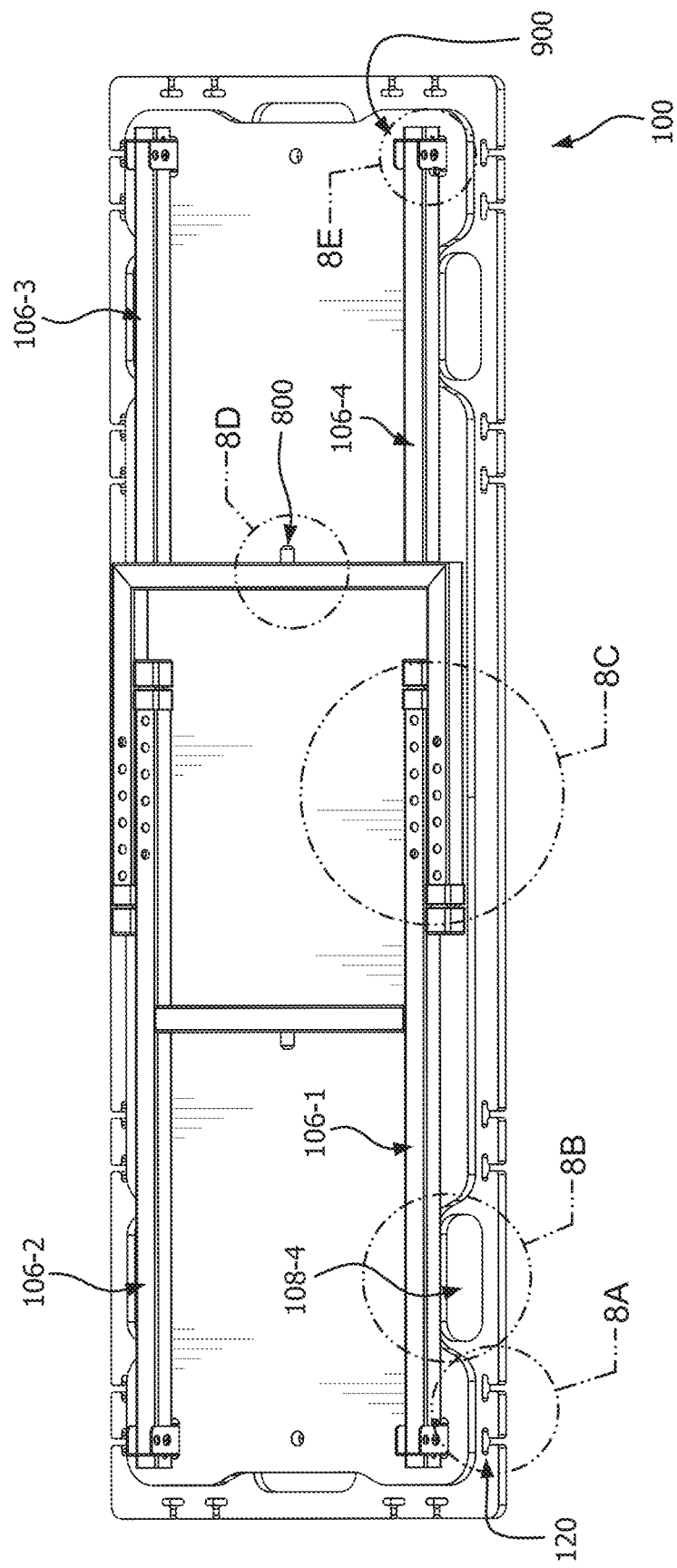

Next, as shown in FIG. 7B, a set of legs are transitioned from their unfolded positions to their folded positions. To fold the legs, a pushing force can be applied to their free ends 702 towards the center of the table 100. The pushing force causes the legs to rotate inward towards the upper part 102. The rotations can be facilitated by hinges coupled between the upper part 102 and the leg. The hinges may be configured such that the legs need to be pulled away from the upper part 102 to allow for such rotations. Rotation of the legs is discontinued when the legs reach the folded position shown in FIG. 7C. Once the set of legs is in its folded position, the other set of legs are caused to rotate towards the center of the table 100 as shown in FIG. 7D.

In some scenarios, legs 106-1, 106-2, 106-3 and/or 106-4 may be telescoping such that the second straight portion(s) 406, 410 can be actuated to collapse into the first straight portion(s) 404, 408, whereby the overall length of one or more legs is shortened. This telescoping can be performed prior to the rotation of the legs.

This process can be reversed to transition the legs back to their unfolded positions. For example, the legs may be rotated in an opposite direction so that the second straight portion(s) 406, 410 thereof are moved away from the upper part 102. The legs may then be extended if they are telescoping or shorted in another manner. Once perpendicular to the upper part 102, the legs may be pushed toward the upper part 102 to disengage rotation of the hinge and/or to lock the legs in the unfolded position. The table may be turned over and the lower part 104 moved away from the upper part 102. The lower part 104 may be rested on the cross bars of the legs. The lower surface may be locked in place. The table may thereafter be used, for example, by coupling accessories thereto. The accessories can include, but are not limited to, tools, tool holders, cup holders, etc.

The legs are described herein as being translated relative to the upper part 102 before rotation occurs. The translation or offsetting of the hinge to permit rotation may be in either of orthogonal directions. For example, as previously described, the legs from the unfolded position are pulled away from the upper part 102 and then rotated toward the upper part 102. The legs from the collapsed position may also be pulled along the upper part 102 (or parallel to the upper part 102), before the leg can be rotated away from the upper part 102. Either or both configurations of the hinge may be used in as described herein.

FIGS. 8A-8F provide illustrations showing close-up views of certain features of the table 100. These features may be used in any combination, including being added, removed, duplicated, or relocated and remain within the scope of the present disclosure.

FIGS. 9A-9F provide illustrations that are useful for understanding how the table 100 transition from the deployed or expanded configuration to the stowed or collapsed configuration. These illustrations are particular focused on the legs 160 and operation of the locking mechanisms associated therewith. A coupler 900 is provided with each leg.

The coupler can include, but is not limited to, a collar 902 coupled to the bottom side 904 of the upper part 102. The collar 902 has an inside shape approximating an outside shape of the top end of the leg 106. As illustrated, the collar 902 has a generally square-shaped cross-sectional profile. A sidewall may not be provided on one side 906 of the collar. The collar 902 has an opening 908 on the side 910 which is opposed from side 906. Sidewalls 912 are provided on the other two sides of the collar which extend from the bottom side 904 of the upper part 102 a certain distance. An aperture 914 is provided in at least one of the sidewalls 912. The aperture 914 is sized and shaped to slidingly receive a depressible member such as a resiliently biased button (not shown) or spring clip 916. The spring clip 916 can be used to selectively lock and unlock the leg 106 in its unfolded position.

Figure 9A:
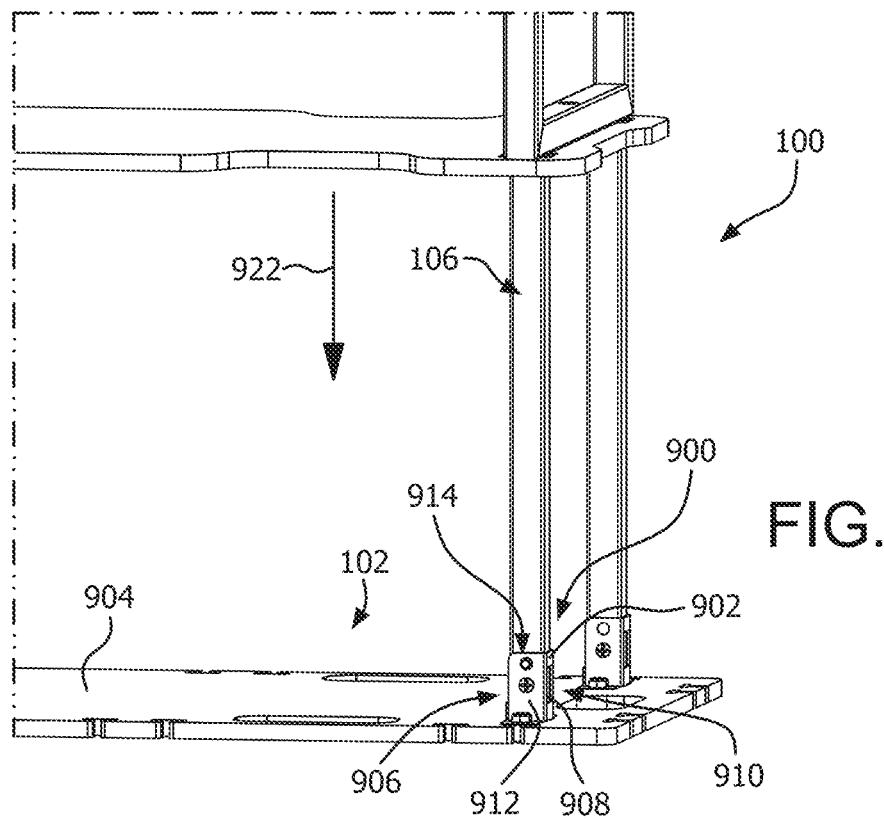
Figure 9B:
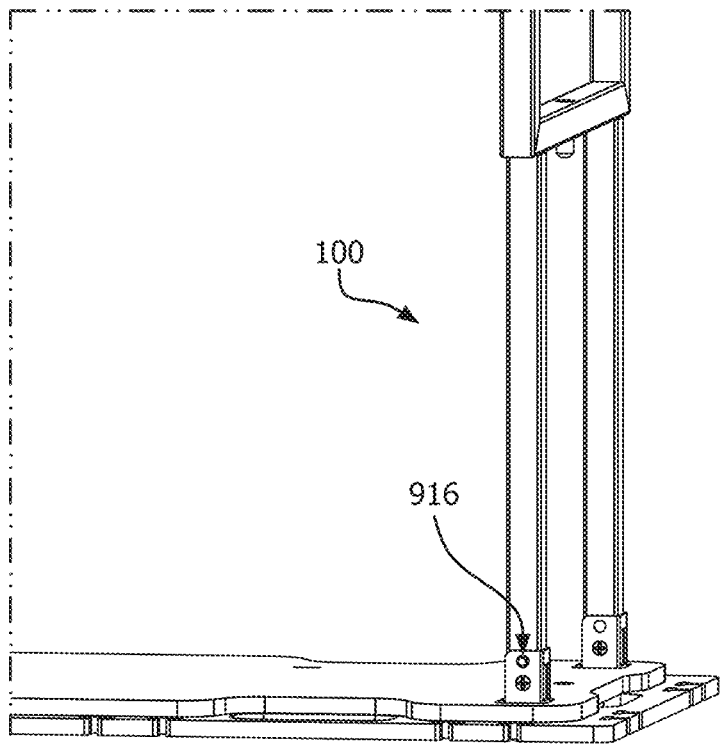
Figure 9C:
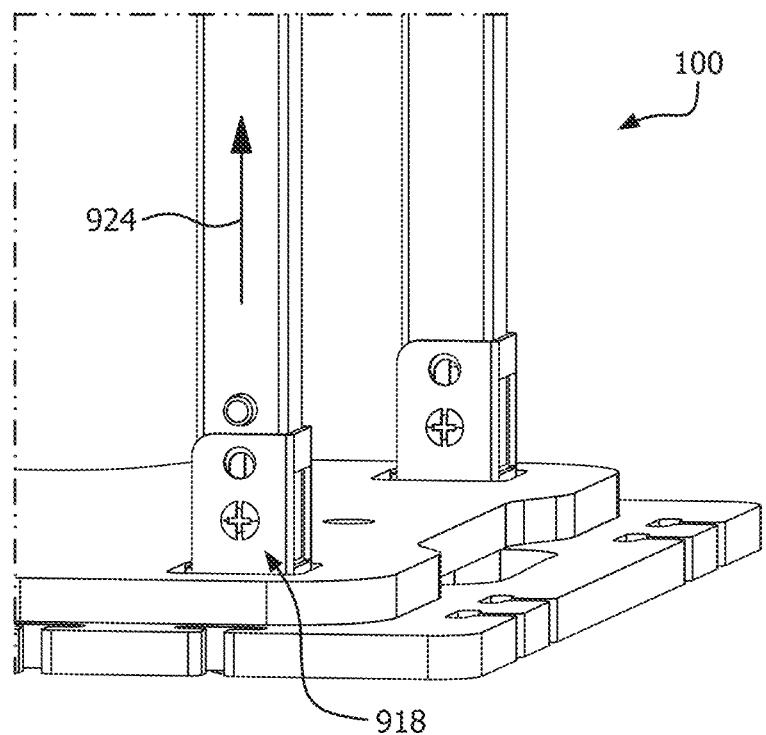

A shaft 918 is coupled between the two sidewall 912. The shaft 918 is sized and shaped to fit in an elongated slot 920 formed in the leg 106. If the leg 106 is hollow, then the elongated slot 920 would be provided through two opposing sidewalls of the leg so that the leg can slidingly receive the shaft therein. This shaft/slot arrangement allows the leg 106 to be moved in direction 924 and at least partially out of the collar 902, as shown in FIG. 9C.

Figure 9D:
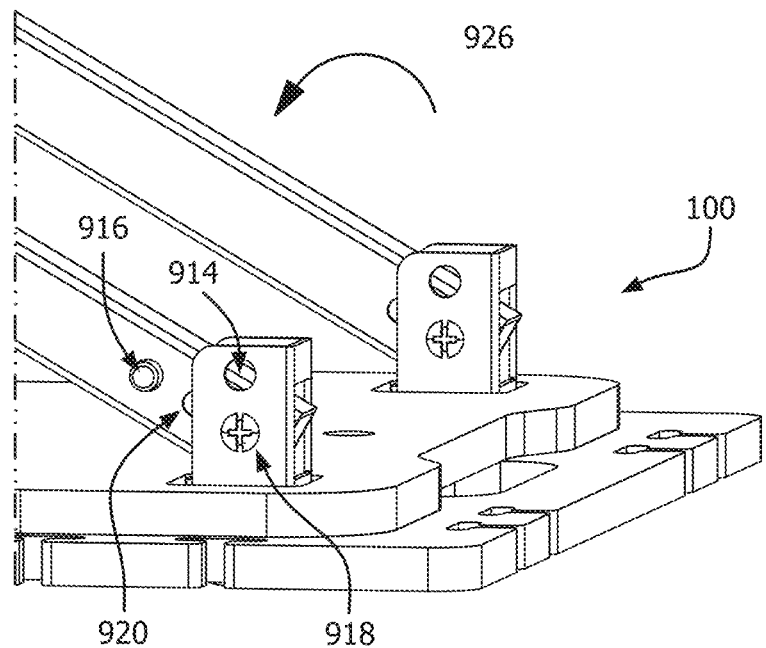
Figure 9E:
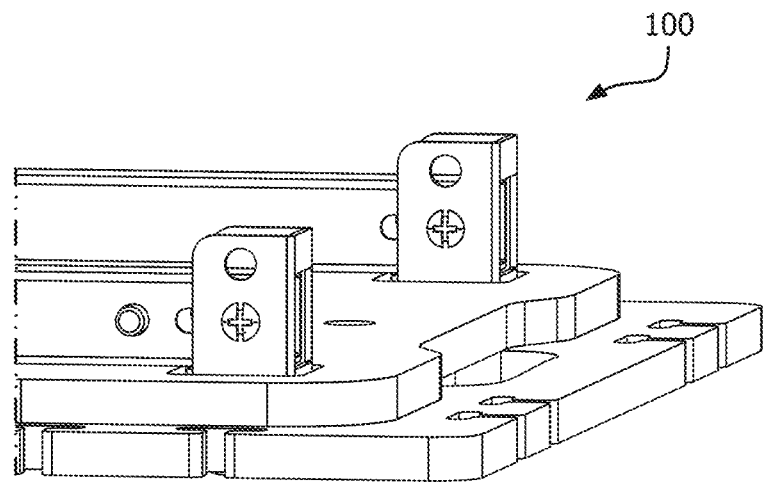
Figure 9F:
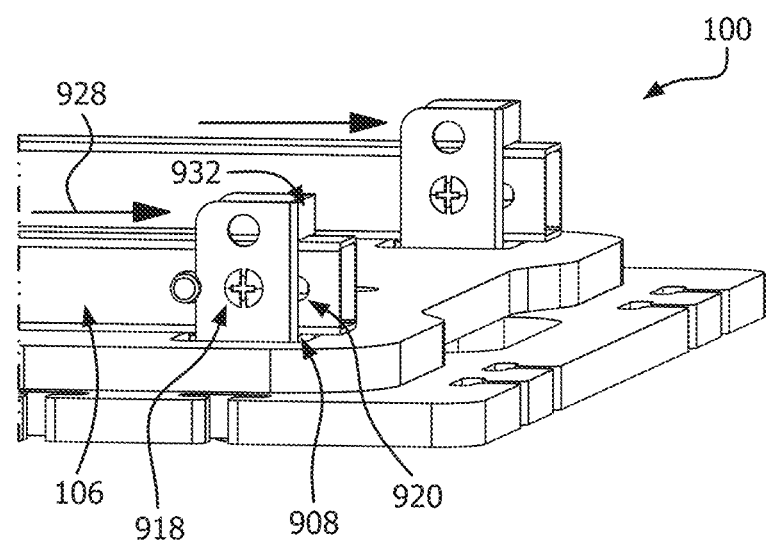
Figure 10A:
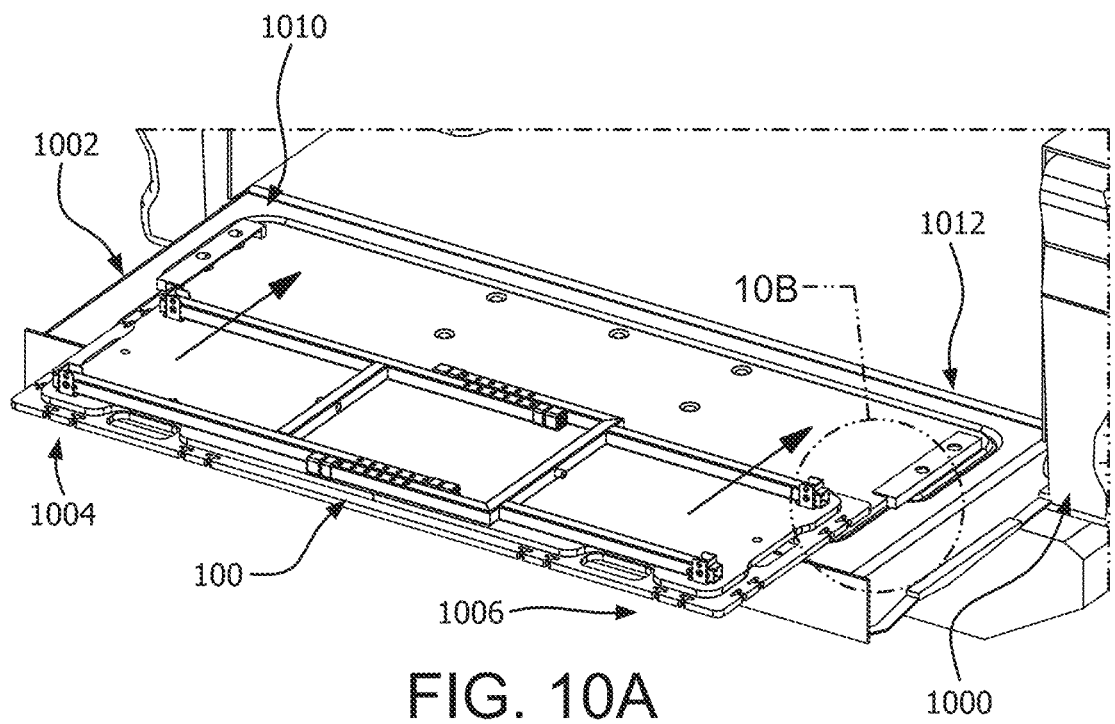
Figure 10B:
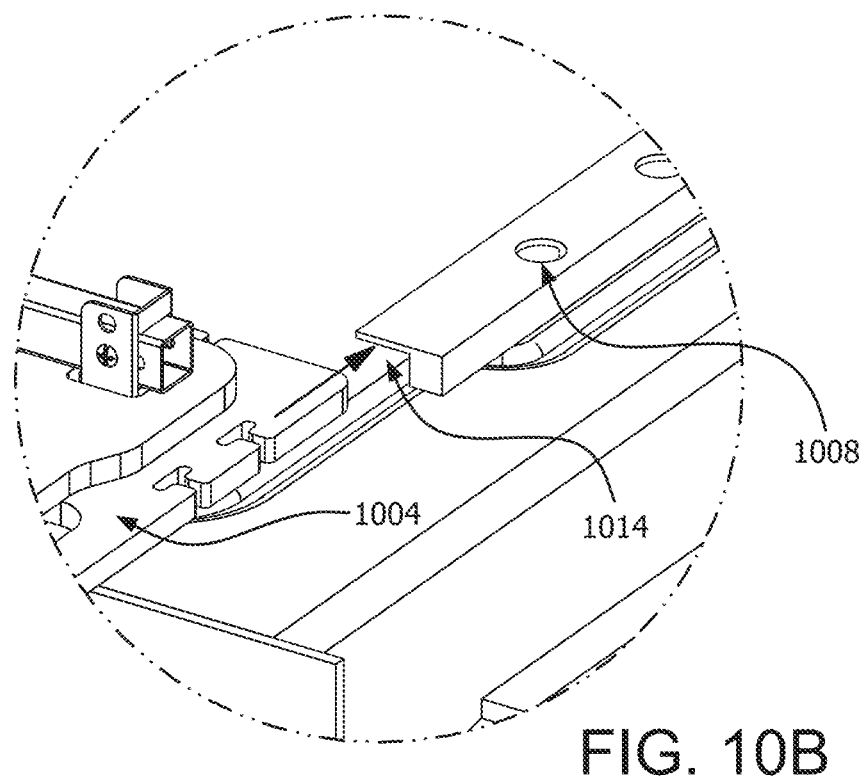
Figure 10C:
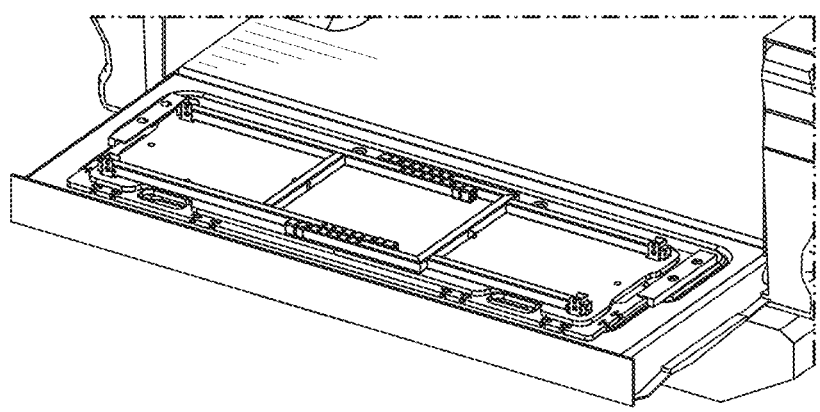
Figure 10D:
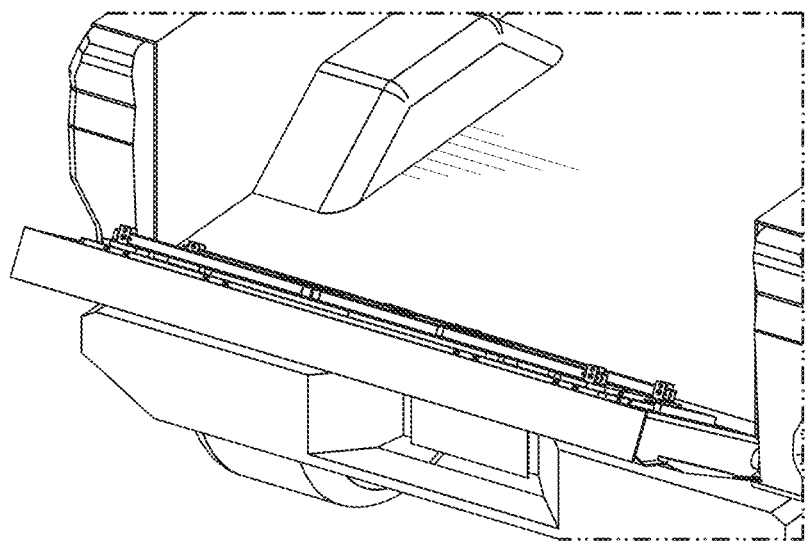
Figure 10E:
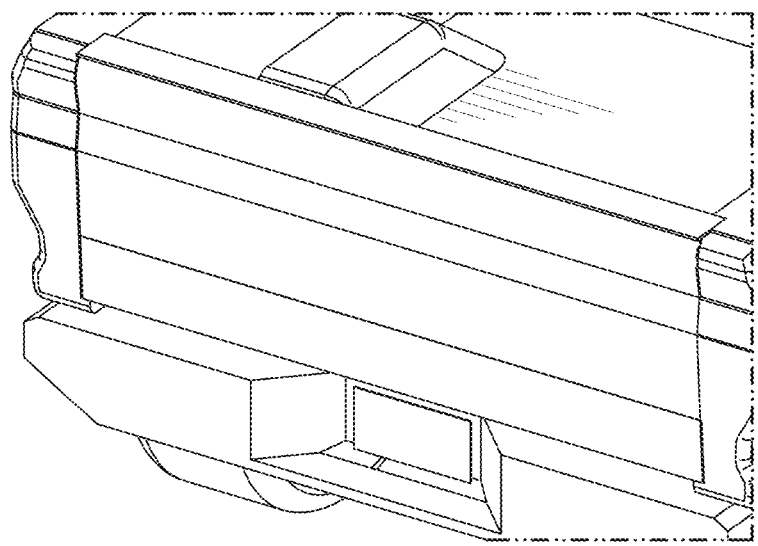

As shown in FIG. 9D, the leg 106 can then be rotated about shaft 918 of the collar 902. The open side 906 of the collar allows the leg 106 to further rotate in a direction 926 until it reaches its folded position shown in FIG. 9E. At this time, the leg 106 can be pushed in direction 928 as shown in FIG. 9F such that a portion of the leg travels through opening 908 formed on side 910 of collar 902. The shaft 918 slides within the elongated slot 920 of the leg 106 while the leg travels in direction 928. The leg 106 is prevented from moving further in direction 928 when the shaft 918 contacts a sidewall of the elongated slot 920. The leg 106 is prevented from rotating relative to the collar by sidewall 910 of the collar. A lock may be provided to lock the leg in this position.

This process can be reversed to transition the leg 106 from the folded position to the unfolded position. For example, the leg may be pulled in a direction opposite to direction 928 out of opening 908, and then rotated in a direction opposite to direction 926 until it is perpendicular with the upper part 102 of the table 100. The spring clip 916 can be pressed to transition it from an uncompressed state to a compressed state. At which time, the leg 106 can be pushed in a direction 922 until the spring clip 916 becomes aligned with aperture 914. When this alignment occurs, spring clip 916 can automatically transition from a compressed state to an uncompressed state, whereby it at least partially extends through the aperture 914 to once again lock the leg 106 in its unfolded position.

FIGS. 10A-10E provide illustrations that are useful for understanding how the table 100 can be stowed in a tailgate 1002 of a truck 1000. The table 100 in the collapsed configuration may include a flange 1004 on each short side 1004, 1006. A bracket 1008 can be provided on each short side 1010, 1012 of the tailgate 1002. The bracket 1008 is configured to provide a slot 1014 in which the table's flange 1004 can be slidingly received. The flange and bracket arrangement may permit the interior portion of the table 100 to be larger than the thickness than that of the perimeter edge portion of the table. A stop structure (not visible in FIG. 10) can be provided with the bracket 1008 to limit the distance that the table's flange 1004 can travel in the slot 1014. The present solution is not limited to the particulars of FIG. 10. In other scenarios, the bracket 1008 is sized and shaped to receive two or more table's flange 1004, whereby multiple tables can be stowed on the tailgate 1002 of a truck 1000.

Exemplary embodiments of the table described herein may include other features such as rubber or friction leg ends to reduce slipping. The leg ends may also or alternatively be contoured. The legs may also be telescoping and may permit variable length or changing the overall height of the table's top surface and/or lower surface. The telescoping legs may change a height of the length at different portions of the leg, such as between the table's top surface and the lower surface or below the lower surface to the ground. The telescoping legs may permit one or more different lengths of the legs to be chosen. The telescoping legs may use two leg portions that are configured to slide along each other, such as with one inside the other. On of the two portions of a leg may include a spring-loaded pin to engage one or more holes in the other of the two portions of the leg.

FIGS. 12A-12G provide illustrations that are useful for understanding a hinged connection between legs and an upper part of the table. A hinge 1200 may be provided instead of the collar 902 described above in relation to FIG. 9. Hinges are well known. Any known or to be known hinge can be used here.

The hinge 1200 comprises a body portion and an extension. The extension is configured as an elongate body 1202. A first terminal end of the elongate body 1202 may be configured to mate with the body portion as described herein. The second terminal end of the elongate body may be any configuration, and need not even remain elongated, linear, etc. the first terminal end of the elongate body may have a cylindrical configuration of constant cross sectional shape. The cross sectional shape is illustrated as rectangular or square, but other cross sectional shapes are contemplated herein, including without limitation a circular or ovoid shape.

The body portion comprises a wall. In an exemplary embodiment, the wall fully circumscribes a perimeter of the body portion. The wall may define an inner cross sectional shape approximate to the outer cross sectional shape of the extension. As illustrated, the wall defines an inner cavity having a cross sectional shape of a rectangle or square. Other shapes are contemplated herein. For example, circular or ovoid shapes are also contemplated herein. As would be apparent from a person of skill in the art, the circular or ovoid shape may be used like a clamp so that the extension may be pushed into an opening of the ovoid or circular wall shape and be retained therein if the wall extends more than 180 degrees about the extension.

The wall is described herein in terms of sides. The sides of the wall is exemplary only and does not restrict the configuration of the wall to the square cross sectional shape as illustrated. Instead, the sides are intended to refer to orthogonal directions of a component part so that one side is distinguished from a second side and positioned opposite to the first side, while the third and fourth sides are positioned orthogonal to the first and second sides and opposite to each other. For example, the cross sectional shape of the extension may be square, and each side is the side of the square. As another example, the cross sectional shape of the extension may be circular, and each side is an orthogonal apex and associated curved edge for ¼ of the component part, similar to the alignment of the component part along an artesian coordinate system.

In an exemplary embodiment, the body comprises a wall that fully circumscribes a perimeter, and defines an enclosure. The enclosure, defined by the wall, may have one open end or may be open at both ends. As illustrated, in FIG. 12A, the wall has a first terminal edge. As illustrated, the first terminal edge is positioned adjacent or next to the underside of the first surface or the lower side of the tabletop. The first terminal edge may be generally planar to match the contour of the table. The first terminal edge may have other shapes corresponding to the surface to which the hinge may be coupled. The first terminal edge may include a flanged lip such as for attaching the body to another surface, such as the underside of the tabletop in the exemplary application. As illustrated, the wall fully circumscribes a perimeter at the first terminal edge of the wall. In an exemplary embodiment, the wall at and/or proximate to the first terminal edge is configured for the first terminal end of the elongate body of the extension may be positioned therein and fully enclosed about a perimeter of the elongate body by the wall.

The wall may extend to different lengths from the first terminal end to a second terminal end along a length of the body. The wall may having openings therein.

A first opening is at a second terminal edge of the wall. The opening is therefore defined by the terminal end of the wall having a shorter length than the wall on adjacent sides of the opening. For example, a first opening may be in a first side of the wall and third and fourth sides of the wall positioned on opposite sides of the first side extend upward past the terminal end of the first side. The first opening may therefore may have a wall on three sides thereof. The first opening may not be fully enclosed but may be in communication with an open end of the wall. As illustrated, the third and fourth sides of the wall are contoured or curved so that the opening in the first wall is defined by the tapering of the third and fourth walls toward the first terminal edge of the wall and then extending across between the third and fourth walls at the first terminal edge across the first side of the wall. The first opening may be shaped so that at least a portion of an edge of the first opening approximates an outer cross sectional shape of at least a portion of the first terminal end of the elongate body. The first opening may be sized and shaped so that the elongate body may be positioned therethrough in a collapsed configuration and be enclosed on at least two sides by the third and fourth sides of the wall.

As illustrated, the wall comprises an opening on a second side of the wall, opposite the first side of the wall. The second opening may be between the first terminal edge and the second terminal edge of the second wall so that the opening is enclosed by the second wall on opposite sides and on the other two sides by the third and fourth sides of the wall. The second opening is therefore fully enclosed by portions of the wall. The cross sectional shape of the second opening may approximate the outer cross sectional shape of the first terminal end of the elongate body. The second opening may be sized and shaped so that the elongate body may be positioned therethrough in the collapsed configuration and be enclosed on at least two sides by the third and fourth sides of the wall.

In an exemplary embodiment, the second opening is configured to overlap the first opening. The overlapping of the second opening with the first opening is configured to permit the first terminal end of the elongate body of the extension to be positioned through the first opening and the second opening simultaneously in the collapsed configuration.

In an exemplary embodiment, a hinge comprises a body. The body comprises a first wall on a first side of the body, and a second wall on a second side of the body. The first and second walls may be generally parallel. The first and second walls may have approximately the same shape. The first and second walls may have third wall extending on one edge of the first and second walls coupling the first and second walls together. The third wall may have a length that is length than a length of at least the first and/or second wall. The first and second walls may have a fourth wall extending on a second edge of the first and second walls coupled the first and second walls together. The third and fourth walls may be on opposite edges of the first and second walls. The first, second, third, and fourth walls may define an enclosed perimeter defining an interior cavity. The interior cavity may be at a first end region of the first and second walls. The interior cavity may be configured such that a terminal end of an elongated portion of a member may be inserted and/or retained therein. The interior perimeter of the interior cavity may have an approximate size and/or shape as an outer perimeter of a cross section of the member. The first and second walls may be coupled together by a fifth wall parallel to the fourth wall. The fifth wall may extend on the second edge of the first and second walls so that the fourth and fifth walls are on the same side of the first and second walls as each other. The fourth and fifth wall may be separated from each other such that a gap is created therein. The gap may define an opening. The opening may be configured such that a terminal end of an elongated portion of a member may be inserted therethrough and a portion of the elongated portion of a member be positioned therein. The opening may have an approximate size and/or shape as an outer perimeter of a cross section of the member.

In an exemplary embodiment, the body has an axel (such as a pin, rod, etc.) extending from a first side thereof to a second side thereof, opposite the first side. According to the embodiments described herein, the axel may extend between the first and second side of a wall or between a first wall and a second wall. The member described herein may have a hole therethrough such that the axel may extend through the hole and the member be rotatable about the axel. In an exemplary embodiment, the hole is elongated so that the member can translate along the axel and/or rotate about the axel. As illustrated, the pin comprises a screw that extends across the housing from a first side to a second side thereof.

As illustrated, the member may have a locking features. The body may have one or more mating features that are configured to accept or interface with the locking feature so that the member may be locked in position relative to the body when the locking feature is engaged with the mating feature. As illustrated, the locking feature is a spring pin that is biased outward and the mating feature is an aperture in the body. The spring pin may be compressed so that it fits within the body. The member may be moved so that the pin is aligned with the aperture and the pin extends outward through the aperture. The member may then be locked relative to the body as the pin prevents rotational and/or translational movement of the member to the body. As illustrated, the body comprises two mating features so that the member may be locked in the collapsed configuration and in the extended configuration.

The enclosures described herein are in terms of fully enclosed, fully circumscribe, full perimeter, etc. The embodiments described herein also include substantially enclosed, circumscribed, of substantially full perimeters, etc. Substantial as used herein may include breaks, openings, etc. but for which enough of the enclosure is retained to achieved the purposes described herein. For example, as illustrated in FIG. 12G, a portion of the wall is broken, but enough of the wall is present to provide the support to the leg as described herein. The application of the hinge and/or table in combination with the knowledge of a person of skill in the art would appreciate what is sufficient in order for the wall to be substantially enclosed. In an exemplary embodiment, a substantial means more than 50%, more than 75%, or more than 90%, and may depend on whether the term substantial is used to describe a side, wall, portions, or a complete component or perimeter enclosure.

FIGS. 12A-12G illustrate the different configurations of the body and member as the member is positioned and transitioned between the collapsed configuration and the expanded configuration.

Figure 12A:
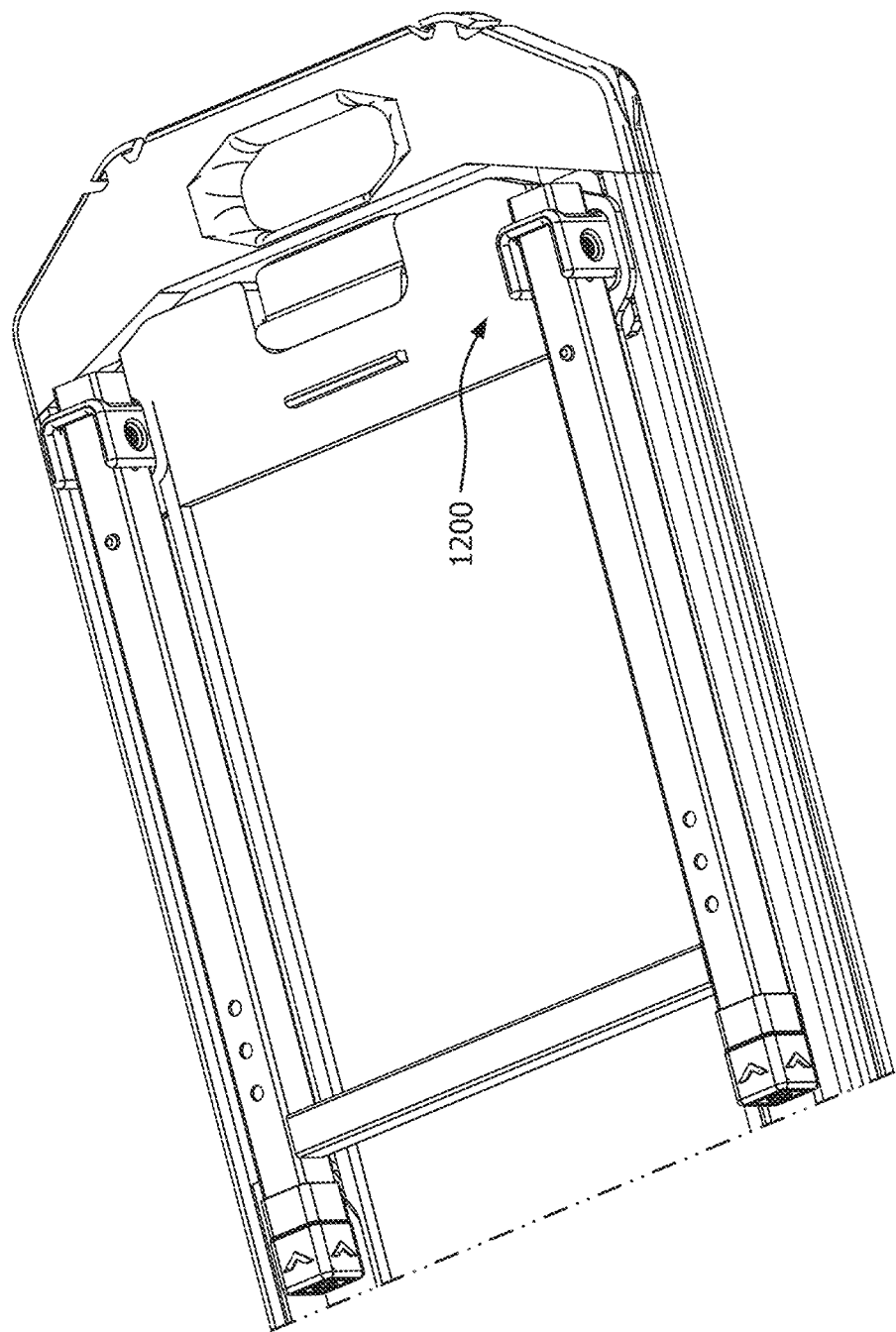

As illustrated in FIG. 12A, the member is positioned in a first position relative to the housing. The locking feature of the member is engaged with a first mating feature of the housing. The member extends through an opening in the housing. The housing therefore fully circumscribes or substantially circumscribes the member about an exterior perimeter thereof. The locking feature of the member is a spring biased pin positioned in a first aperture of the housing.

Figure 12B:
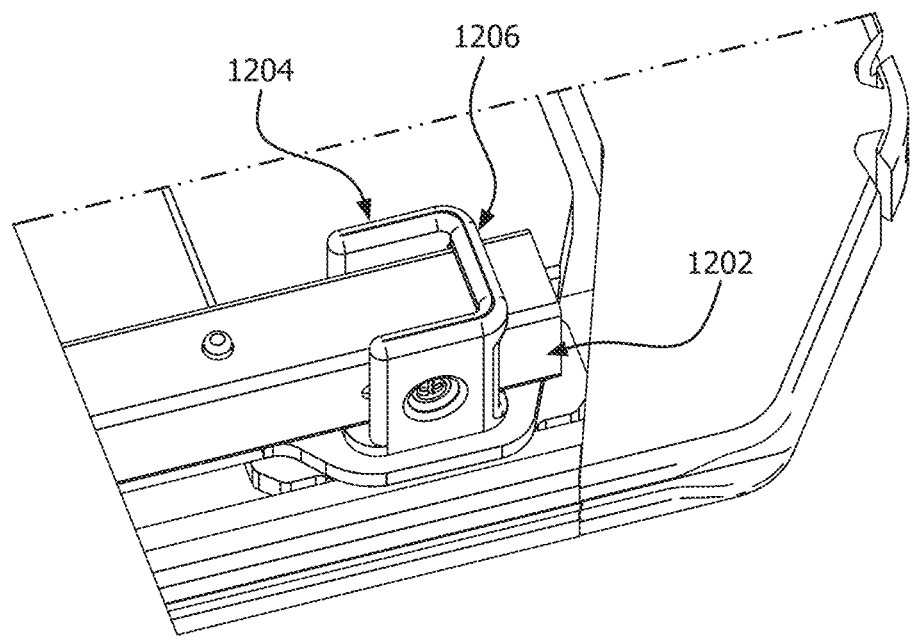
Figure 12C:
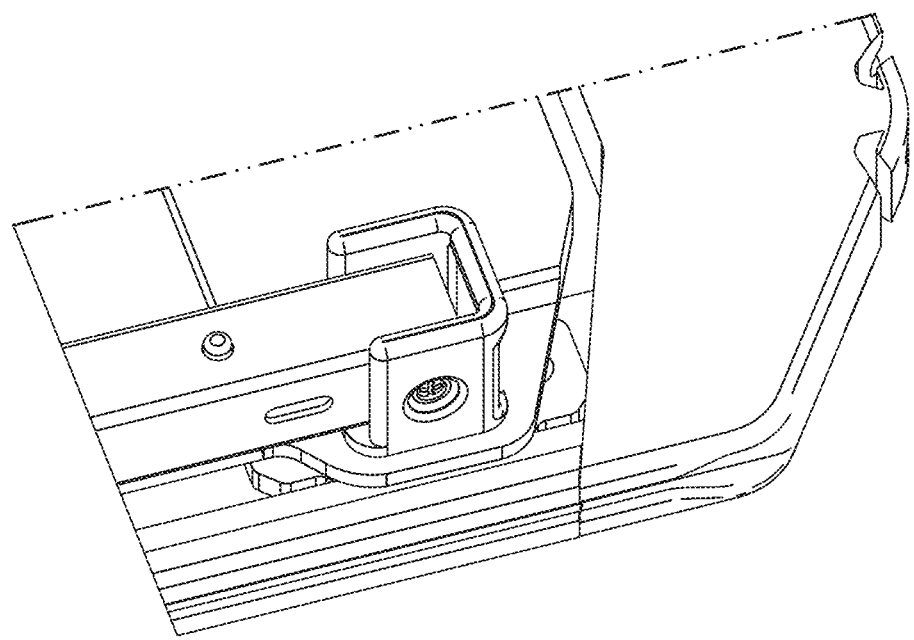

As illustrated in FIGS. 12B-12C, the locking feature of the member may be disengaged from the mating feature of the housing so that the member is configured to translate relative to the housing. The member may be moved out of the opening of the housing. The locking feature may be disengaged. As illustrated, the spring biased pin is outside of the housing.

Figure 12D:
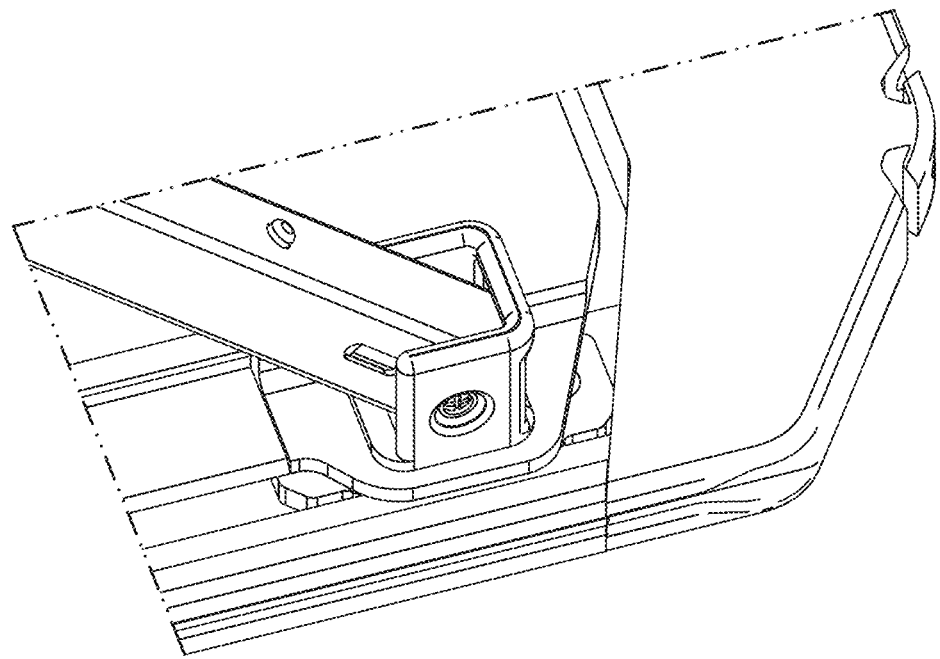
Figure 12E:
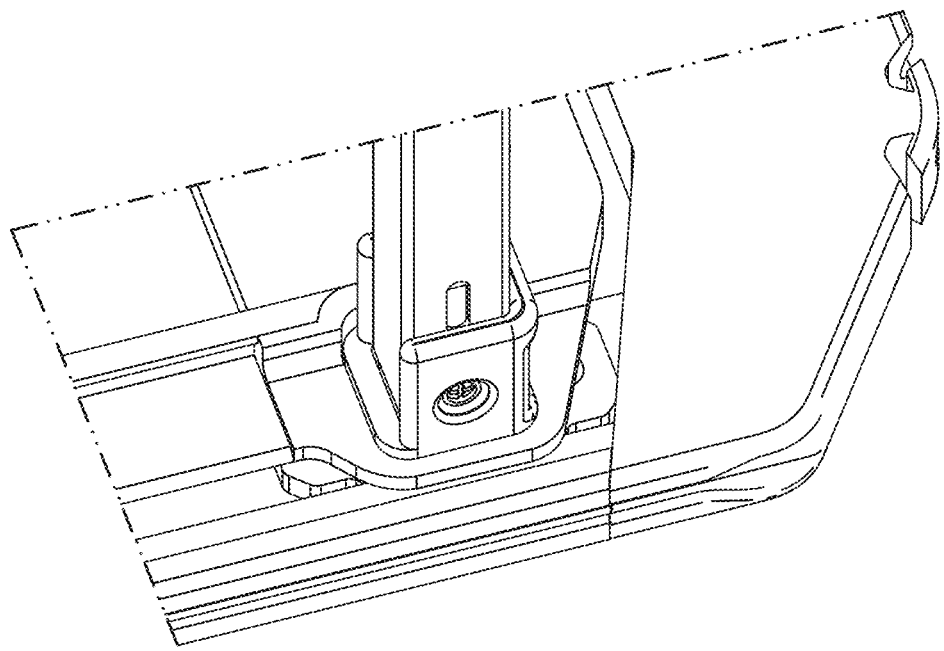

As illustrated in FIG. 12D, the member is configured to rotate relative to the housing. The wall(s) of the housing may be shaped so that the wall does not interfere with the locking features. As illustrated, the first side and second side of the wall or the first and second walls are curved so that the spring biased pin extending outward does not encounter the wall or interfere with the rotational movement of the member relative to the housing.

Figure 12F:
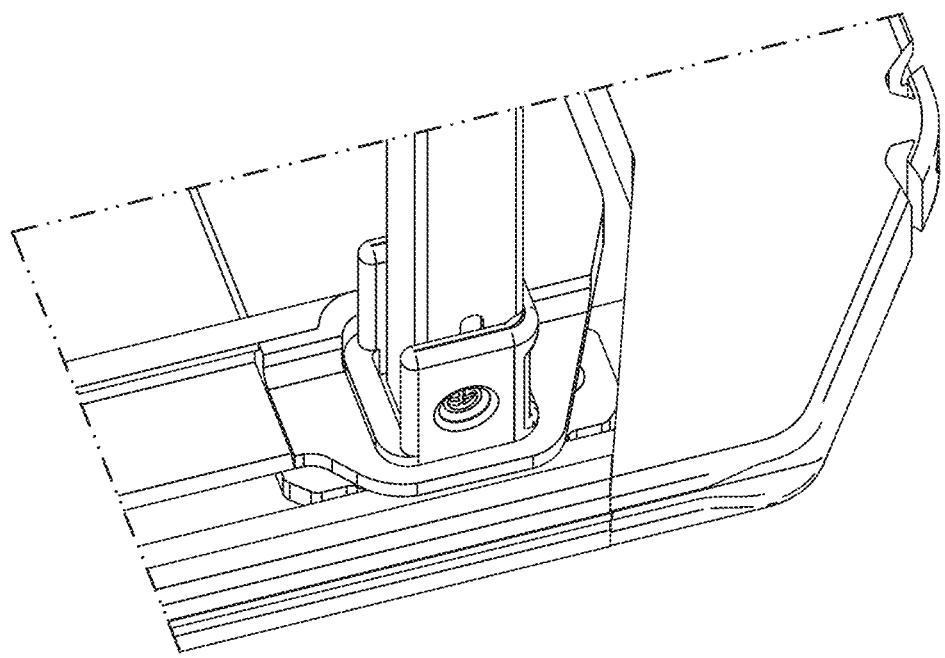
Figure 12G:
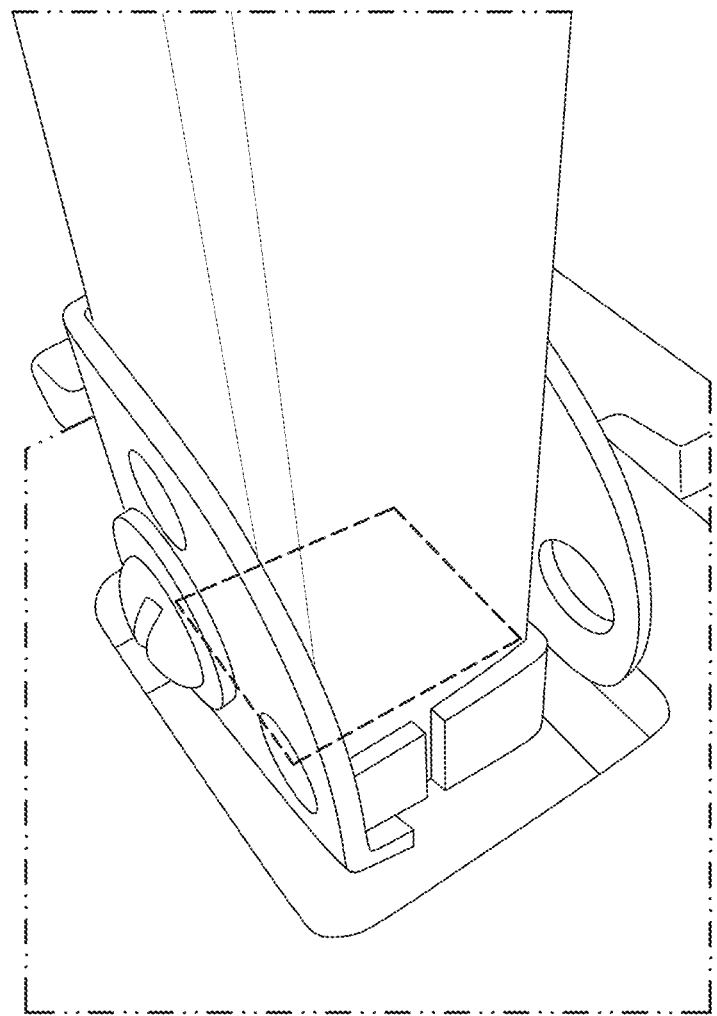

As illustrated in FIG. 12F-12F, the member may be oriented perpendicular to the original orientation of the member. The locking feature may be disengaged so that the member may translate relative to the housing. As illustrated, the spring biased pin may be depressed so that that the pin may fit within the housing and the member translate into the housing. The locking feature may thereafter engage with a second mating feature of the housing. As illustrated, the spring biased pin extends outward through a second aperture within the housing.

As illustrated in FIG. 12G, the member may be positioned within the housing so that a substantial portion of the housing circumscribes the member. The member may be positioned within the enclosure defined by the wall(s) of the housing.

Exemplary embodiments of the hinge described herein may provide one or more advantages. As illustrated, the wall of the housing may provide a separation from a lower surface of the housing so that a gap is created thereby. The gap may be used to position another surface or structure. The member may therefore be in a collapsed configuration while provided space to accommodate other components parts, such as the lower surface described herein. As illustrated, the substantial enclosure of the member in one or more configurations may provide added strength and/or stability to the member when in that position. The member may therefore be supported without the use of additional cross members. The resulting structure may be more robust, sturdy, and/or hold additional weight. As illustrated, the member may be supported on all fours sides of the member in one and/or two positions of the member relative to the housing. As illustrated, the locking features may be used to require positive action by a user to transition the member relative to the housing.

FIGS. 13A-13C illustrates different perspective views of a wall accessory 1300 that can be used with table 100. Wall accessory 1300 may be configured to mount to the table 100 and/or to a wall. The wall accessory 1300 may include a panel 1302 that has apertures 1304 that are the same as or approximate the apertures 120 on the table 100. In this regard, apertures 1304 are generally T-shaped. Any number of apertures 1304 can be provided with the wall accessory 1300. The apertures 1304 may be equally or unequally spaced apart from each other in accordance with a given application. The wall accessory 1300 can be used to structurally support tools or other items. For example, a worker may use the wall accessory 1300 to support and/or organize tools or other items. The wall accessory 1300 can then be removed from the wall and positioned on the upper part 102 of the table such that the apertures 1304 are aligned with apertures 120 on the table 100. The user may therefore move accessories from a storage location to a work location without having to reorganize the accessories. Other accessories are contemplated hereby.

Referring now to FIGS. 13-14, there is provided an illustration of a table assembly 1300 comprising a table 1302 and accessories 1304, 1306, 1308, 1310, 1312, 1314, 1316, 1318. The accessories 1304-1318 are shown coupled to the table 1300 in FIG. 13 and shown removed from the table in FIG. 13. The table 1300 is similar to table 100 but with some differences, for example, relating to the legs and the manner in which accessories can be coupled thereto and decoupled therefrom. In addition to or as an alternative to aperture(s) 108, 120-126 of FIG. 1, table 1300 employs one or more tracks 1320. The tracks 1320 can be attached to the sidewalls of the table via any attachments means (e.g., screws, adhesives, etc.). Alternatively, the tracks 1320 can be integrally formed with the sidewalls of the table, for example, during an injection moulding process.

A track can be provided on one or more sidewalls 1324, 1326, 1328, 1330 of the upper part 1322 of the table 1300. Each track 1320 has a slot sized and shaped to receive at least a protruding portion of one or more accessories 1304-1318. The protruding portion may include, but is not limited to, a rolling wheel or post with an enlarged circular head. In this way, the accessory can be (i) slide in two opposing directions relative to a respective sidewall 1324, 1326, 1328, 1330 of the upper part 1322 of the table 1300, and (ii) suspended adjacent to the table 1300 as shown in FIG. 13. The tracks may or may not comprise a stop member at one end thereof to prevent the accessory from sliding out of the track. The stop member may be fixed or removable. The stop member can be formed of any suitable material such as metal and/or rubber.

The table 1300 will now be described in more detail in relation to FIGS. 15-19. Table 1300 has an upper part 1502, a lower part 1504, and four legs 1506. The legs 1506 (i) extend between the upper part 1502 and the lower part 1504, and (ii) extend past the lower part 1504 to support the upper and lower parts 1502, 1504 above the ground, floor or other object there below.

The lower part 1504 may be used to define a shelf of the table 1300. The lower part 1504 may be separated from the table 1500. In this regard, protruding members 1548, 1552 are provided on the short sides 1550, 1554 of the lower part 1504. The protruding members 1548, 1552 may be used as handles for gripping and/or removing the lower part 1504 from the table 1500. An illustration of the table 1500 with the lower part 1504 removed therefrom is provided in FIG. 16.

The upper part 1502 provides a tabletop for the table 1300. The upper part 1502 has aperture(s) 1508-1, 1508-2, 1508-3 (collectively referred to as "1508") formed therethrough. The aperture(s) 1508 are located adjacent to an outer perimeter of the upper part 1502. Each aperture 1508-1, 1508-2, 1508-3 may comprise an elongated hole with a longer dimension aligned with a respective edge 1540, 1542, 1544, 1546 of the table 1500 to which the aperture is adjacent. The aperture 1508-1, 1508-2, 1508-3 may provide handles for gripping and/or moving the table 1300. Although three apertures 1508 are shown, any number thereof can be provided in accordance with a given application.

The apertures 1508 are shown as having a curved rectangular or ovoid shape. The present solution is not limited in this regard. The apertures may have other shapes such as a rectangular shape and a square shape. The apertures may be fully enclosed by the material of the upper part 1502 as shown, or alternatively only be partially enclosed by the material of the upper part 1502 (not shown). For example, each aperture 1508-1, 1508-2, 1508-3 may alternatively comprise a "T" opening from the perimeter edge of the table, or some other shape or configuration.

Other apertures (not shown for ease of illustration) may be provided on the upper part 1502, as shown in FIG. 15. The apertures may be configured to assist with carrying the table 1300, securing the table 1300 in a stowed or collapsed configuration, and/or provide accessory couplers. For example, apertures may be used as attachment points for accessories and other objects. In this way accessories and other objects can be removably attached to the table 1300 via hooks, hangers and/or other mechanical couplers. These apertures may comprise different shapes. One or more of the apertures may provide a bottle opener or hook. The accessories can include, but are not limited to, a drying rack 1304, storage bin(s) 1308, 1310, 1312, 1316, 1318, a cutting board 1314, and/or a paper towel holder 1306 with a hanging hook 1352 at its free end.

Apertures may have generally L-shapes. The present solution is not limited in this regard. The apertures can have other shapes selected in accordance with a given application. For example, one or more apertures can alternatively have a T-shape or Y-shape. Any number of apertures can be provided in accordance with a given application.

One or more tracks 1320 are provided on the two long sides 1324, 1328 of the table 1300. Each track 1320 has a slot 1510 sized and shaped to receive at least a protruding portion 1400 of one or more accessories 1304-1318. The protruding portion 1400 may include, but is not limited to, a rolling wheel or post with an enlarged circular head. In this way, the accessory can be (i) slide in two opposing directions relative to a respective sidewall 1324, 1326, 1328, 1330 of the upper part 1322 of the table 1300, and (ii) suspended adjacent to the table 1300 as shown in FIG. 13. The tracks may or may not comprise a stop member at one end thereof to prevent the accessory from sliding out of the track. The stop member may be fixed or removable. The stop member can be formed of any suitable material such as metal and/or rubber.

The lower part 1304 may be used to define a shelf or second layer of the table 1300. The lower part 1304 may be separated from the upper part 1302 to define two separate supporting structures for the table 1300. Protruding members 1348, 1352 may be provided on the short sides 1350, 1354 of the lower part 1304. The protruding members 1348, 1352 may be used as handles for gripping and/or removing the lower part 1304 from the table 1300. An illustration of the table 1300 with the lower part 1304 removed therefrom is provided in FIG. 16.

In FIG. 15, the table 1300 is shown in the deployed or expanded configuration with the upper part 1502 providing a generally flat tabletop surface 1530 extending parallel to a flat top surface 1532 of the lower part 1504. The flat top surface 1532 of the lower part 1504 is spaced apart and separated from the tabletop surface 1530 so that two supporting levels are created for supporting different objects at different vertical heights relative to ground.

The upper part 1502 is securely coupled to legs 1506. Legs 1506 extend out and away from a bottom side of the upper part 1502. Each leg 1506 is a telescoping leg comprising a first tube portion 1512 and a second tube portion 1514. The first tube portion 1512 is hollow with an inner channel having a size larger than the size of the second tube portion 1514. The second tube portion 1514 can be slidingly received in the inner channel of the first tube portion 1512. The second tube portion 1514 can slide into and out of the first tube portion 1512.

The first tube portions 1512 of two adjacent legs 1506 are connected to each other via a cross bar 1516. The cross bar 1516 may be configured to structurally support the lower part 1504 when the table 1300 is in its deployed or expanded configuration shown in FIG. 15. The cross bars 1516 are located at a location along the legs to maintain the lower part 1504 a certain distance below the upper part 1502 when they are being used to structurally support the lower part 1504.

The telescoping legs facilitate a transition of the table 1300 from the deployed or expanded configuration to a stowed or collapsed configuration (and vice versa). To transition the table to the stowed or collapsed configuration, the lower part 1504 is first removed from the table 1300 as shown in FIG. 16. Next, the second tube portions 1514 of the four legs 1506 are slid into the first tube portions 1512 thereof. This results in a decrease in overall length of the four legs 1506. The collapsed legs 1506 are then rotated towards a center of the table 1300 until they reside adjacent to the bottom surface of the upper part 1302. Any mechanical coupling can be used to couple the legs 1506 to the upper part 1302 provided that they allow rotation thereof. This process can be reversed to transition the table 1300 to the deployed or expanded configuration. It should be noted that the length 1600 of the first tube portions 1512 of each leg is less than half the length 1602 of the upper part 1302 such that, during the transitions, its free end 1604 does not contact the free end 1606 of an opposing leg or such that its free end 1604 is able to slide against free 1606.

Referring now to FIG. 20, there is provided a flow diagram of an illustrative method 2000 for operating a table (e.g., table 100 of FIG. 1 or 1300 of FIG. 13). Method 2000 begins with 2002 and continues with 2004 where the table is obtained. The table comprises an upper part (e.g., upper part 102 of FIG. 1 or 1502 of FIG. 15), a lower part (e.g., lower part 104 of FIG. 1 or 1504 of FIG. 15), and legs (e.g., legs 106 of FIG. 1 or 1506 of FIG. 15).

In block 2006, at least one accessory (e.g., 1304-1318 of FIG. 13) is decoupled from the table. This decoupling may be achieved by sliding a protruding structure (e.g., structure 1400 of FIG. 14) of the accessory through a channel (e.g., channel 1510) of a track (e.g., track 1320) coupled to or integrated with a sidewall (e.g., sidewall 1324, 1326, 1328 or 1330 of FIG. 13) of the upper part. The protruding structure may have a moveable part (e.g., a rollable wheel) configured to facilitate ease with coupling and decoupling the accessory to/from the table. Additionally or alternatively, the protruding structure can have a coating to minimize friction between itself and the walls of the track's channel.

Method 2000 may continue to optional block 2008 wherein the lower part is removed from the table or caused to slide towards the upper part along the legs until the lower part resides adjacent to the upper part. A locking member may be actuated in block 2008 to allow for movement of the lower part relative to the upper part. Telescoping parts of each leg may optionally be collapsed in optional block 2010. A locking mechanism may be actuated in optional block 2012 to discontinue a locking engagement between each of the legs and the upper part. In block 2014, the legs are optionally pulled in a direction away from the upper and lower parts to discontinue prevention of rotation of the legs towards the center of the table.

Next in 2016, a first pushing force is applied to first ends of first legs (e.g., legs 106-3, 106-4 of FIG. 4 or 1506-3, 1506-4 of FIG. 15) which are coupled to each other by a first cross bar (e.g., cross bar 402 of FIG. 4 or 1516 of FIG. 15). The first pushing force causes the first legs to rotate towards the center of the table until the first legs reside adjacent to the upper part or lower part of the table. In 2018, a second pushing force is applied to the first legs to cause the first legs to slide against the upper or lower part in a first direction (e.g., direction 928 of FIG. 9) away from the center of the table until second ends of the first legs are received into openings (e.g., openings 908 of FIG. 9) formed in first couplers (e.g., 900 of FIG. 9) that are coupling the first legs to the upper part. Upon completing 2018, method 2000 continues to block 2020 of FIG. 20B.

As shown in FIG. 20B, block 2020 involves using a shaft (e.g., shaft 918 of FIG. 9) extending through an elongated slot (e.g., slot 920 of FIG. 9) of each first leg to limit a distance that the first legs can travel in the first direction (e.g., direction 928 of FIG. 9).

Next in block 2022, a third pushing force is applied to first ends of second legs (e.g., legs 106-1, 106-2 of FIG. 4 or 1506-1, 1506-2 of FIG. 15) which are coupled to each other by a second cross bar. The second pushing force causes the second legs to rotate towards the center of the table until the second legs reside adjacent to the upper or lower part of the table. The first ends of the second legs may horizontally and/or vertically overlap the first ends of the first legs when the first and second legs reside adjacent to the upper or lower part (e.g., as shown in FIG. 6). Additionally when the first and second legs reside adjacent to the upper or lower part, one or more of the following exist, (i) the first ends of the second legs may both nested between first ends of the first legs, and/or (ii) the first ends of the second legs may extend parallel to the first ends of the second legs. The term "horizontally overlap" as used herein means to have common points on a horizontal axis, while the term "vertically overlap" as used herein means to have common points on the vertical axis. The horizontal axis and vertical axis extend perpendicular to each other. For example, the horizontal axis may comprise a y-axis and the vertical axis may comprise an x-axis. The present solution is not limited in this regard.

A fourth pushing force is applied to the second legs in block 2024 to cause the second legs to slide against the upper or lower part in a second direction away from the center of the table until second ends of the second legs are received into openings (e.g., openings 908 of FIG. 9) formed in second couplers (e.g., 900 of FIG. 9) that are coupling the second legs to the upper part. The second direction is opposite the first direction. Shaft(s) can be used in block 2026 to limit a distance that the second legs can travel in the second direction.

In optional 2028, the table is stored in a tailgate (e.g., tailgate 1002 of FIG. 10) of a truck (e.g., truck 1000 of FIG. 10). This can involve sliding at least right and left side portions (e.g., flanges 1004 of FIG. 10) of the upper part into brackets (e.g., brackets 1008 of FIG. 10) coupled to the tailgate when the table is in the stowed configuration. Subsequently, method 2000 continues to block 2030 where it ends or other operations are performed (e.g., the table is transitioned from its stowed configuration to its deployed configuration).

Exemplary embodiments described herein may use the term surface to describe components of the table. The term surface is not limited to just the surface but may include the structure defining the surface. For example, the top surface may include the tabletop structure in which the top surface is apparat. Accordingly, when the top surface is described as contacting another structure, such as the legs and/or lower surface, the contact may be to any structure part of the top surface, including, for example, the lower side of the structure that defines the top surface.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

When used in this specification and claims, the terms "comprises" and "comprising" and variations thereof mean that the specified features, steps or integers are included. The terms are not to be interpreted to exclude the presence of other features, steps or components.

We claim:

1. A method for operating a table with an upper part providing a tabletop, a lower part providing a shelf and a plurality of legs, comprising:

transitioning the table from a deployed configuration to a stowed configuration by:

applying a first pushing force to first ends of first legs of the plurality of legs which are coupled to each other by a first cross bar positioned at or near middles of elongate lengths of the first legs, wherein the first pushing force causes the first legs to rotate towards the center of the table until the first legs reside adjacent to the upper part or lower part of the table;

applying a second pushing force to the first legs to cause the first legs to slide against the upper or lower part in a first direction away from the center of the table until second ends of the first legs are received into openings formed in first couplers that are coupling the first legs to the upper part;

applying a third pushing force to first ends of second legs of the plurality of legs which are coupled to each other by a second cross bar, wherein the second pushing force causes the second legs to rotate towards the center of the table until the second legs reside adjacent to the upper or lower part of the table; and applying a fourth pushing force to the second legs to cause the second legs to slide against the upper or lower part in a second direction away from the center of the table until second ends of the second legs are received into openings formed in second couplers that are coupling the second legs to the upper part, wherein the second direction is opposite the first direction;

wherein a first distance between top portions of the first legs is smaller than a second distance between bottom portions of the first legs, and a third distance between the second legs has a same value along entire lengths of the second legs;

wherein the top portions of the first legs are coupled to the first cross bar at first locations that are closer to a center of an elongate length of the first cross bar as compared to second locations on the elongate length of the first cross bar at which the bottom portions of the first legs are coupled; and wherein when the first and second legs reside adjacent to the upper or lower part: (i) elongate lengths of both the first and second legs extend adjacent directly to the upper or lower part of the tabletop, (ii) the first ends of the second legs are both nested within first ends of the first legs, and (iii) the first ends of the second legs extend parallel to the first ends of the first legs.

2. The method according to claim 1, further comprising causing the lower part to slide towards the upper part along the plurality of legs of the table until the lower part resides adjacent to the upper part, prior to application of the first pushing force.

3. The method according to claim 2, further comprising actuating a locking member to allow movement of the lower part relative to the upper part prior to causing the lower part to slide towards the upper part.

4. The method according to claim 1, further comprising removing the lower part from the table prior to application of the first pushing force.

5. The method according to claim 1, further comprising collapsing telescoping parts of each leg of the plurality of legs prior to application of the first and third pushing forces.

6. The method according to claim 1, further comprising pulling the first legs and the second legs in a direction away from the upper and lower parts to discontinue prevention of rotation of the first and second legs towards the center of the table.

7. The method according to claim 6, further comprising actuating a locking member to discontinue a locking engagement between each of the first and second legs and the upper part, prior to said pulling.

8. The method according to claim 1, further comprising using a shaft extending through an elongated slot of each leg of the first and second legs to limit a distance that the leg can travel in the first direction and to limit a distance that the leg can travel in the second direction, when the leg resides adjacent to the upper or lower part of the table.

9. The method according to claim 1, further comprising decoupling at least one accessory from the table prior to application of the first pushing force, wherein the decoupling is achieved by sliding a protruding structure of the at least one accessory through a channel of a track coupled to or integrated with a sidewall of the upper part.

10. The method according to claim 1, further comprising storing the table in a tailgate of a truck by sliding at least right and left side portions of the upper part into brackets coupled to the tailgate when the table is in the stowed configuration.

11. A table, comprising:
an upper part providing a tabletop;
a lower part providing a shelf; and
a plurality of legs comprising first legs that are coupled to each other by a first cross bar positioned at or near middles of elongate lengths of the first legs and second legs that are coupled to each other by a second cross bar; and
a plurality of couplers coupling the first legs and the second legs to the upper part;
wherein table is transitionable from a deployed configuration to a stowed configuration via (i) an application of a first pushing force to first ends of first legs which causes the first legs to rotate towards the center of the table until the first legs reside adjacent to the upper part or lower part of the table, (ii) an application of a second pushing force to the first legs which causes the first legs to slide against the upper or lower part in a first direction away from the center of the table until second ends of the first legs are received into openings formed in first couplers of the plurality of couplers, (iii) an application of a third pushing force to first ends of second legs which causes the second legs to rotate towards the center of the table until the second legs reside adjacent to the upper or lower part of the table, and (iv) an application of a fourth pushing force to the second legs to cause the second legs to slide against the upper or lower part in a second direction away from the center of the table until second ends of the second legs are received into openings formed in second couplers of the plurality of couplers;
wherein a first distance between top portions of the first legs is smaller than a second distance between bottom portions of the first legs, and a third distance between the second legs has a same value along entire lengths of the second legs;
wherein the top portions of the first legs are coupled to the first cross bar at first locations that are closer to a center of an elongate length of the first cross bar as compared to second locations on the elongate length of the first cross bar at which the bottom portions of the first legs are coupled; and
wherein when the first and second legs reside adjacent to the upper or lower part: (i) elongate lengths of both the first and second legs extend adjacent directly to the upper or lower part of the tabletop, (ii) the first ends of the second legs are both nested within first ends of the first legs, and (iii) the first ends of the second legs extend parallel to the first ends of the first legs.

12. The table according to claim 11, wherein the lower part is slidable towards the upper part along the plurality of legs until the lower part resides adjacent to the upper part and is slidable away from the upper part along the plurality of legs until the lower part is supported by the first and second cross bars.

13. The table according to claim 12, further comprising a locking member configured to selectively allow movement of the lower part relative to the upper part.

14. The table according to claim 11, wherein the lower part is removable from the table.

15. The table according to claim 11, wherein each of the plurality of legs comprises telescoping parts.

16. The table according to claim 11, wherein the plurality of couplers are configured to require a pulling force to be applied to the first legs and the second legs in a direction away from the upper part to discontinue prevention of rotation of the first and second legs towards the center of the table.

17. The table according to claim 16, further comprising a locking member configured to allow a selective discontinuance of a locking engagement between each of the first and second legs and the upper part.

18. The table according to claim 11, further comprising a shaft extending through an elongated slot of each leg of the first and second legs and configured to limit a distance that the leg can travel in the first direction and to limit a distance that the leg can travel in the second direction, when the leg resides adjacent to the upper or lower part of the table.

19. The table according to claim 11, further comprising at least one aperture formed in the upper part that is configured to receive at least a portion of an accessory.

20. The table according to claim 11, further comprising a track coupled to or integrated with a sidewall of the upper part, wherein the track comprises a channel through which a protruding structure of an accessory can slide.

21. The table according to claim 11, wherein the at least right and left side portions of the upper part are sized and shaped to slide into and out of brackets coupled to a tailgate of a truck when the table is in the stowed configuration.

* * * * *